United States Patent [19]

Shinosaka et al.

[11] Patent Number: 5,717,956
[45] Date of Patent: Feb. 10, 1998

[54] SYSTEM FOR BATCH PROCESSING OF COMMANDS BY EMULATING COMMAND STRING AND RECORD FORMAT IF THE STRING DETECTOR DETECTS COMMAND IS OF A SPECIFIED COMMAND STRING

[75] Inventors: Tsutomu Shinosaka; Kazuhiro Inada; Tadahiko Imaizumi; Masanori Kadowaki, all of Kawasaki; Kiyonori Yamazaki, Tokyo; Hidefusa Saitoh; Yoshiki Fushimi, both of Kawasaki, all of Japan

[73] Assignee: Fujitsu Limited, Kawasaki, Japan

[21] Appl. No.: 235,795

[22] Filed: Apr. 29, 1994

[30] Foreign Application Priority Data

Jul. 30, 1993 [JP] Japan ................................ 5-189495

[51] Int. Cl.$^6$ ...................................................... G06F 13/00
[52] U.S. Cl. ........................... 395/885; 395/825; 395/834
[58] Field of Search ............................. 360/135, 97.01, 360/48; 395/425, 500, 600, 650, 37, 404, 439, 872; 364/236.2, 238.4, 243, 245.1, 248.1, 252.3, 256.3, 952.1

[56] References Cited

U.S. PATENT DOCUMENTS

| | | | |
|---|---|---|---|
| 3,863,217 | 1/1975 | Taylor | 340/146.1 |
| 3,986,171 | 10/1976 | Spoelder | 340/172.5 |
| 4,467,421 | 8/1984 | White | 364/200 |
| 4,542,458 | 9/1985 | Kitajima et al. | 364/200 |
| 4,642,759 | 2/1987 | Foster | 364/200 |
| 4,727,512 | 2/1988 | Birkner et al. | 364/900 |
| 4,779,196 | 10/1988 | Manga | 364/200 |
| 4,800,550 | 1/1989 | Yamauchi | 369/59 |
| 4,805,090 | 2/1989 | Coogan | 364/200 |
| 4,947,367 | 8/1990 | Chang et al. | 364/900 |
| 5,115,490 | 5/1992 | Komuro et al. | 395/400 |
| 5,140,683 | 8/1992 | Gallo et al. | 395/425 |
| 5,253,351 | 10/1993 | Yamamoto et al. | 395/425 |
| 5,261,065 | 11/1993 | Urabe et al. | 395/425 |
| 5,274,772 | 12/1993 | Dunn et al. | 395/275 |
| 5,301,304 | 4/1994 | Menon | 395/500 |
| 5,388,013 | 2/1995 | Nakamura | 360/48 |
| 5,410,676 | 4/1995 | Huang et al. | 395/500 |
| 5,526,518 | 6/1996 | Kashio | 395/600 |
| 5,530,819 | 6/1996 | Day, III et al. | 395/404 |

*Primary Examiner*—Thomas C. Lee
*Assistant Examiner*—Anderson I. Chen
*Attorney, Agent, or Firm*—Staas & Halsey

[57] ABSTRACT

An input-output control system for an external storage which has an information processing main frame having a CPU and a main storage, software loaded in the information processing main frame for holding data in an arbitrary record format, an external storage connected to the information processing main frame for recording data in a record format different from the record format of the software, and a record format converter mounted in the information processing main frame for writing in and reading from the external storage by emulating a command string of one or more commands, which is created by the software to access the external storage, and by emulating the data record format of the external storage as the data record format of the software.

22 Claims, 18 Drawing Sheets

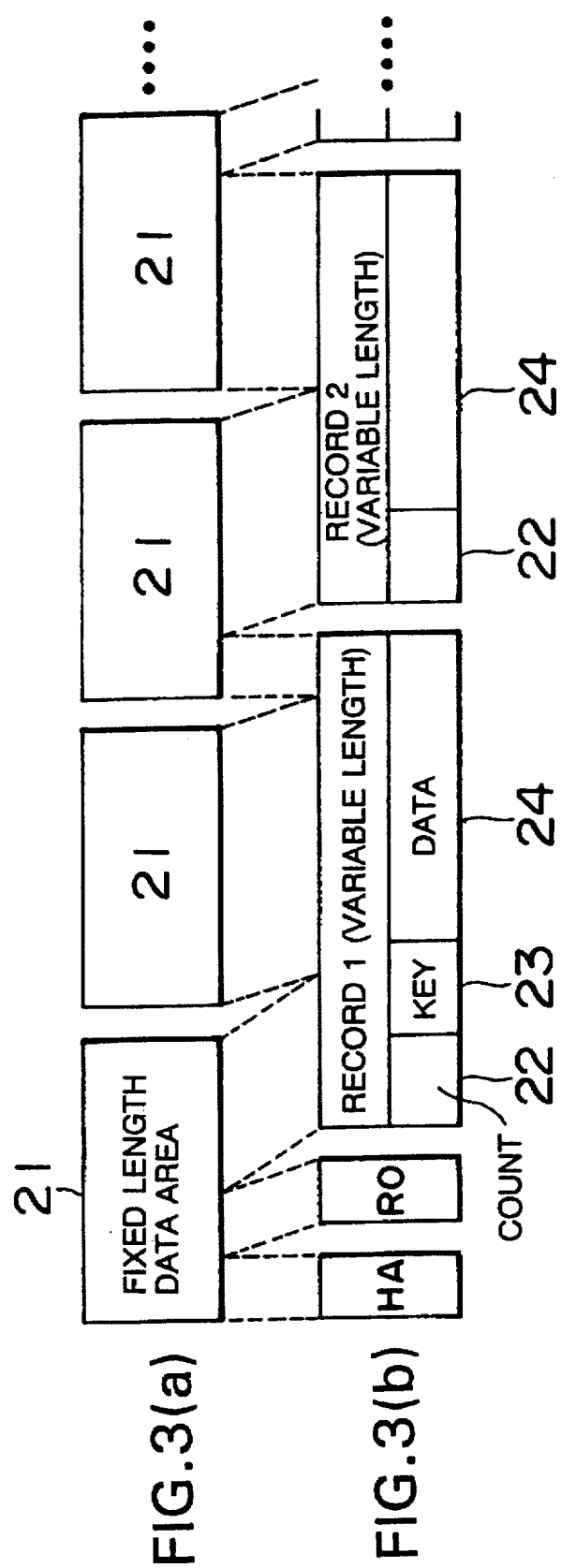

RECORDING FORMAT OF THE
MAGNETIC DISK DEVICE

UPDATE HA AND R0

FORMAT PROCESSING WITHOUT
HA AND R0

READING DATA

FIG.16
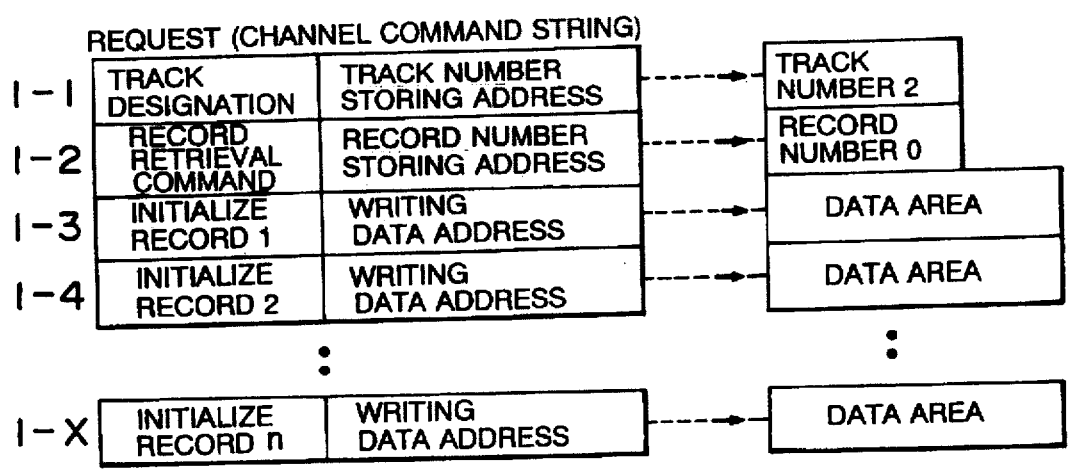
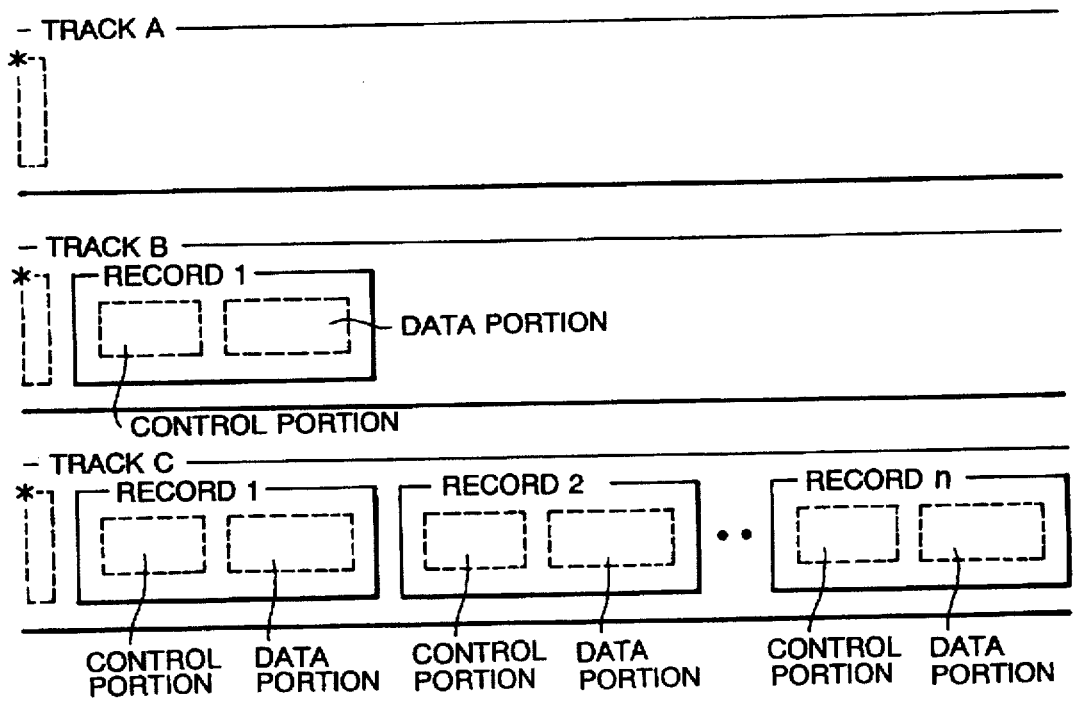

FIG.18
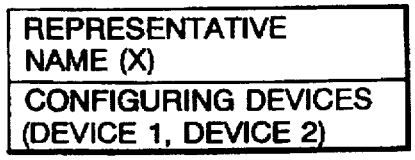
401 CONFIGURATION INFORMATION
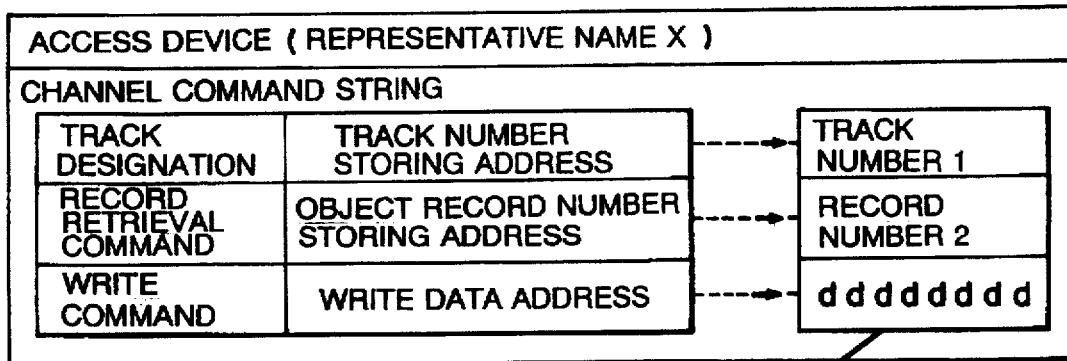
402 REQUEST PROCESSING
403 MEMORY    405
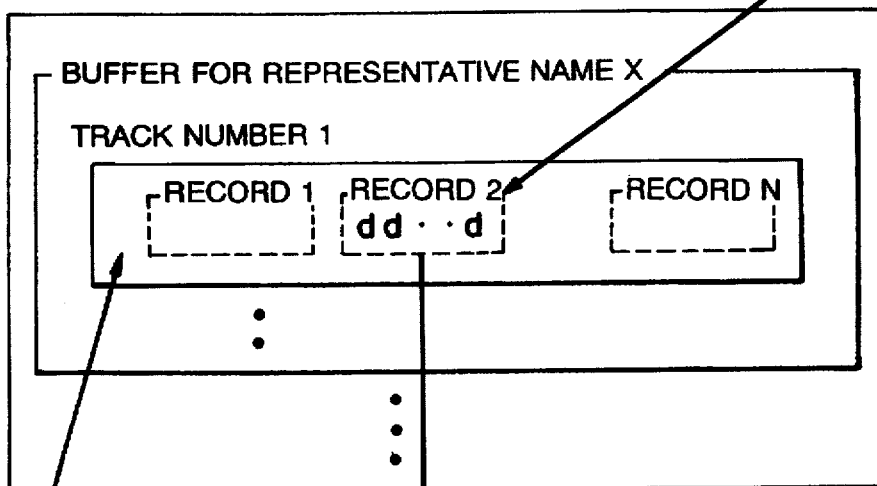
404
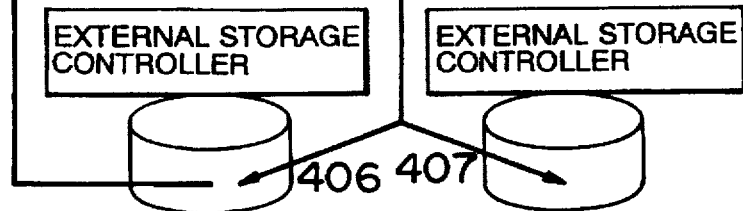
EXTERNAL STORAGE 1    EXTERNAL STORAGE 2

FIXED LENGTH RECORD

VARIABLE LENGTH RECORD

UNDEFINED LENGTH RECORD

WITHOUT KEY

WITH KEY

FIG.21(a)
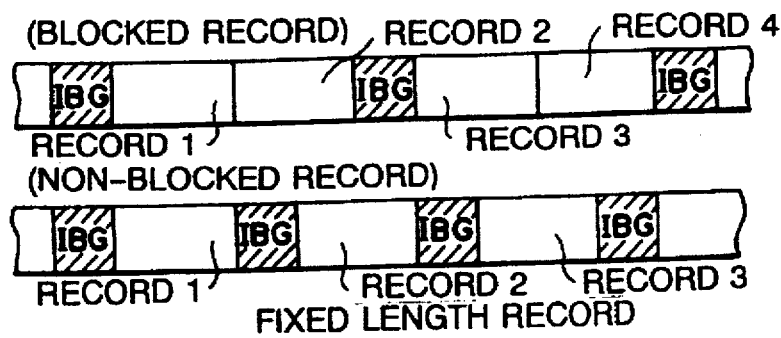
FIG.21(b)
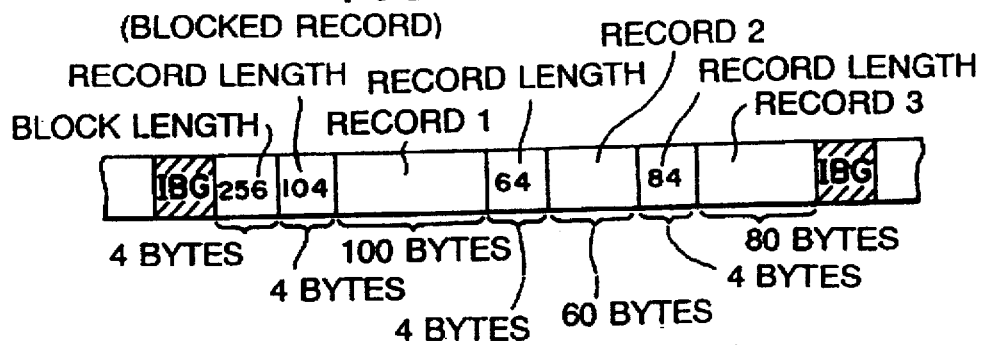
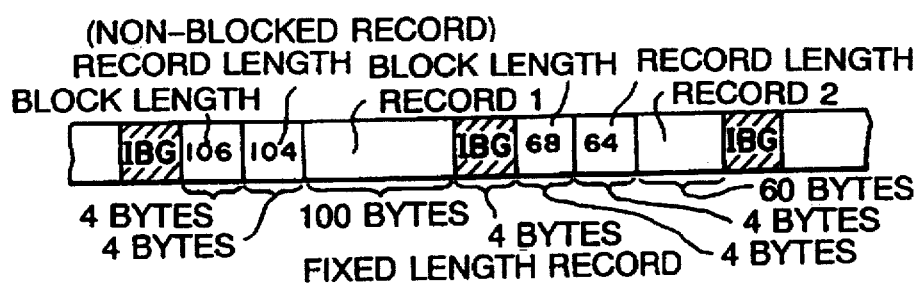
FIG.21(c)
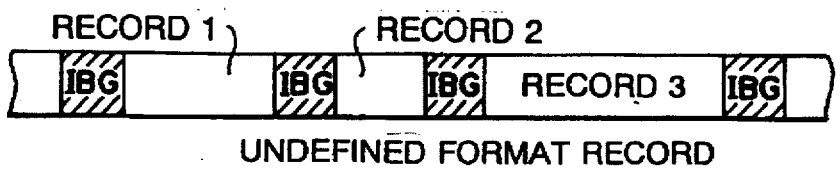

SYSTEM FOR BATCH PROCESSING OF COMMANDS BY EMULATING COMMAND STRING AND RECORD FORMAT IF THE STRING DETECTOR DETECTS COMMAND IS OF A SPECIFIED COMMAND STRING

BACKGROUND OF THE INVENTION

1. Field of the Invention

This invention relates to a system for recording data into an external storage, and more particularly, to a system for controlling data processing when an information processor is connected to an external storage whose record format is different from that of the information processor.

2. Description of the Related Art

The record format for an external storage such as a magnetic disk device, which is a direct access storage device, is currently exemplified by a sector format of dividing each of tracks, to which a magnetic head is to be positioned, into sectors of a predetermined byte length (fixed length record format), and a variable method of recording the (physical) record of an arbitrary length from an arbitrary position of the track, along with information (a count section and a key section) identifying the record (variable length record format). FIGS. 19(a) and 19(b) respectively show an example of the fixed length record and an example of the variable length record. Another record format for the direct access storage device is an undefined length record as shown in FIG. 19(c). The fixed length record format is a format in which all logical records in file have the same length. The variable length record format is a format in which the individual records have different lengths, requiring a field indicating the corresponding length for each record. The undefined length record format is a kind of variable length record and does not have any fields indicating the length of the individual record. In recording, the whole record is divided into blocks each composed of a plurality of records and is written in and read from a recording medium in terms of blocks, thus reducing the gaps between the records. The records in blocks are called blocked records. A single blocked record is called a "physical record" since it is to be physically written and read. Each of the records of a single block is called a "logical record". The number of logical records in a single physical record is a "blocking factor", and the physical record whose blocking factor is 1 is called a "non-blocked record".

The fixed length record format may deal with either the blocked record or non-blocked record. The variable length record format also may deal with either the blocked record or non-blocked record; however, in the blocked record, the number of logical records and the length of block are variables for every block. The undefined record deals with the data as a non-blocked record. The data block format is shown in FIG. 20

Also in the magnetic tape unit, various kinds of formats such as the fixed length record (F format), the variable length record (V format) and the undefined length record (U format) are used.

Since various kinds of record formats thus currently exist for different external storage devices, a device to access to such different external storage devices requires a device for recording data in different record formats one for each external storage to be used.

More particularly, since conventional operation systems, for large general purpose computers, such as a multiple virtual storage (MVS) and a multi-dimensional system (MSP) as well as application programs to operate on these systems are manufactured on the assumption that the magnetic disk unit for storing data is of the variable length record format, it was impossible to use any magnetic disk unit of fixed length record, which is high-performance, small-size and inexpensive, with no drastic reconstruction, thus making the whole system large in size and high in cost.

This conventional art is exemplified by Japanese Patent Laid-Open Publication No. SHO 60-41124, disclosing a magnetic disk device of fixed length record. A record format converter is mounted in a magnetic disk controller, and the magnetic disk device of fixed length record is accessible by an access device of variable length record.

Specifically, a track of fixed length record corresponding to the track for which an access request has been made by the access device of variable length record is read from the magnetic disk device, and a designated processing is made with respect to this data. If any writing has been made on any track, the content of the track is written back to the magnetic disk device after being processed.

The magnetic disk device of Japanese Laid-Open Publication No. SHO 60-41124 can deal with only fixed length record data, while software on the information processing main frame can deal with only variable length record data.

According to this prior art, since mounting the fixed-length-record-to-variable-length-record converter in the magnetic disk controller emulates the magnetic disk device of fixed length record as the magnetic disk device of variable length record with respect to software, it is possible for software to get access to the magnetic disk device.

When accessing the external storage, software describes on a main storage of the information processing main frame a designation to the external storage according to a string of one or more commands. When the leading address of this command string, the device number of the external storage, etc., are given to a channel unit, the channel unit supplies the commands of the command string successively to the magnetic disk controller which performs the processing with respect to the magnetic disk device.

The magnetic unit controller gives the received commands to a command executing section of the record format converter which section executes the commands one after another.

At that time, if the track to be accessed exists on the memory, the command executing section will execute the processing with respect to data on this memory. If it does not exist on the memory, the command executing section will not do the processing until the corresponding track is read onto the memory by a data transmitter. The data on the memory will be written back to the corresponding track of the magnetic disk device upon completion of processing of the command string and before reading a new track.

However, with this prior arrangement, since the record format is converted on the magnetic disk controller, it is necessary to provide a record format converter on every magnetic disk controller which requires record format conversion. Further, since the device to access to the magnetic disk controller supplies commands one at a time to the magnetic disk controller, it was impossible to process a plurality of commands simultaneously.

Japanese Patent Laid-Open Publication No. HEI 4- 7759 discloses a data file format converter, and Japanese Patent Laid-Open Publication No. HEI. 1-51523 discloses a file organization system. Either arrangement shows the concept of converting the data format in data set to be recorded on the external storage and hence cannot be used in converting the record format to be determined by the attribute of the external storage, which is the problem to be solved by the present invention.

Additionally it has been common knowledge that writing and reading of data with respect to an external storage must be done as quickly and effectively as possible.

SUMMARY OF THE INVENTION

It is therefore an object of this invention to facilitate converting the record format irrespective of the type of an external storage.

Another object of the invention is to effectively conduct the controlling of an external storage, such as record format conversion.

To solve the foregoing problems, the present invention takes the following measures.

In an input-output control system, for an external storage, according to first aspect of the invention, a record format converter is provided at the side of an information processor which accesses the external storage. The result is that the access device having a single record format can access to one or more kinds of external devices accessible in an arbitrary record format.

It is therefore unnecessary to provide the above-mentioned data record format converter for every external storage.

The data record format converter converts the fixed length record format, for example, of a magnetic disk device to the variable length record format which software on the information processor deals with; that is, it deals with the fixed length record format as emulated as the variable length record format. Consequently the relationship between the recording format for variable length record and the recording format for fixed length record is presented in a conversion table. This conversion table should provide for every external storage of a different recording format. When storing data into the external storage, the variable length record from the information processor is converted into the fixed length record format with reference to the conversion table by the converter and is stored in the corresponding external storage. On the contrary, when reading data from the external storage, the fixed length record from the external storage is converted into the variable length record format with reference to the conversion table for use in application on the information processor.

Further, in the present invention, a device for prereading a plurality of commands on a command string is employed. This enables high-speed processing, such as the processing of plural commands in batch and the processing devoid of any reading from the external storage, i.e., without reading data from the external storage at every processing.

Specifically, the system of this invention has a specified format command string detector for detecting whether one or more commands to the external storage is of a specified format, and a batch processing section for executing the plural commands in batch if the specified format command string detector has detected the specified format command string. This causes high-speed input/output to the external storage.

Some command strings which are to be executed frequently are previously selected and registered in the specified format command string register section so that the specified format command string detector can detect quickly whether or not the given command is of the specified format, by referring to the specified format command string register section.

The system may have a specified format command string qualifying section for detecting a pattern in the individual command string and for entering the command string of this pattern in the specified format command string qualifying section as the specified format command string if the pattern appears three times, for example.

Preferably, a device such as a buffer memory or cache memory is mounted on the format converter for storing plural data. Data to be processed is temporarily stored from the external storage into this memory where the record format is converted and is then stored back to the external stored. It is accordingly to reduce the number of accesses to the external storage.

Further, a section for performing busy management and error management may be provided in the converter to minimize reports of busy status and error status to software as well as the processing quantity of software, thus realizing a high-speed processing.

In the present invention, the record format to be converted refers to data layout, such as the relationship between the variable length and the fixed length and differently stored data, exclusive of the code system, etc. In an alternative example, however, the invention may be combined with converting the code system, without any contradiction with the gist of the invention.

Between the information processing main frame and the external storage, writing and reading of data with respect to the external storage takes place via a channel unit. The input-output command words to be executed by the channel unit are called "channel commands", i.e., READ and WRITE, for use in data transfer to the external storage.

For effective use of a computer, it has been demanded that a number of operating systems are operated by a single computer. With this respect, a virtual computer has been suggested. However, in order to realize a virtual computer, it is necessary to perform simulation processing of a CPU instruction and an I/O instruction, such as a channel command string which is an input-output request.

To this end, according to the present invention, the information processor has a data map for discriminating whether or not a channel command string to be simulated is a specified format channel command string, a detector for detecting a channel command string of a specified format using the data map, and a simulating section for simulating the whole of the specified format channel command string in batch if the specified format channel command string is detected. This makes it possible to process a specified format channel command string at high speed.

In a channel command string emulation processing system according to a second aspect of the invention, track data of a direct access external storage is expanded on a memory. The system comprises a retrieval pointer for retrieving the record to be processed, a pointer updating section for indicating whether or not the contents of the pointer should be updated, and an identifying section for identifying the processing section (control section and data section) to process the record at last. This makes it possible to retrieve the object record at high speed.

The system further comprises an identifying section for discriminating whether or not the track to be accessed has already been expanded on the memory, a command identifying section for identifying whether or not the given channel command string is a request for rewriting the leading record in the track, and a pseudo-track data generator. When the command is a request for rewriting the whole data, such as creating, returning or initializing data in the track, the whole pseudo-track data is rewritten. This enables high-speed data processing.

In computers and more particularly in data accessing to an external storage storing massive data base, high-speed accessing and high reliability are very important factors. Regarding high-speed accessing, in the system in which the track data stored in the external storage is expanded on the memory where the access processing from an application takes place, new technology is desired to greatly improve the reliability of data, without impeding the high-speed processing.

One measure for high reliability of data in the conventional track emulation processing is realized by performing emulation processing with respect to the multiplexed individual volumes repeatedly to cope with the multiplexed volume processing to be controlled by the operating system. As another measure, the external storage is equipped with a multiplexed volume controller independently of the operating system. The latter measure is essential in track emulation processing; in reading track data from the external storage and transferring the updated data to the external storage, the external storage accesses the multiplexed individual volumes by itself.

A record medium in the unit form of an individual magnetic disk pack or magnetic tape which is attachable and detachable is called "volume".

In the present invention, in order to solve all of the foregoing problems by combining the multiplexed volume control, which the operating system performs, and the track emulation processing, and in order to realize reduction of memory capacity, reduction of overhead and reduction of system cost as well as fault-proofness coping with either the external storage or the external storage controller, the system comprises the following: a volume configuration information posting section for creating configuration information to which device numbers, which composes the multiplexed volume, and a name representing these device numbers are added, and for posting the configuration information to the track emulation processing section; a configuration information holder for holding the configuration information in the track emulation processing section, a selector for selecting the external storage (any device composing a single volume in data reading, or all devices composing the multiplexed volumes in data writing) to access to, based on the configuration information, and a memory managing section for managing the memory, on which the track data is expanded, by the name representing the multiplexed volume. With this arrangement, high-speed emulation processing and high-reliability record data are realized at low cost and with fewer resources.

BRIEF DESCRIPTION OF THE DRAWINGS

FIG. 3(a) and 3(b) are diagrams showing the contrast of fixed length record data and undefined length record data;

FIG. 16 is a diagram showing the processing of an eighth embodiment;

FIG. 18 is a diagram illustrating the processing of the ninth embodiment;

FIGS. 21(a) through 21(c) are diagrams showing various record formats of a magnetic tape unit.

DETAILED DESCRIPTION OF THE EMBODIMENTS

Various preferred embodiments of this invention will now be described with reference to the accompanying drawings.

Embodiment 1

Figure 1:
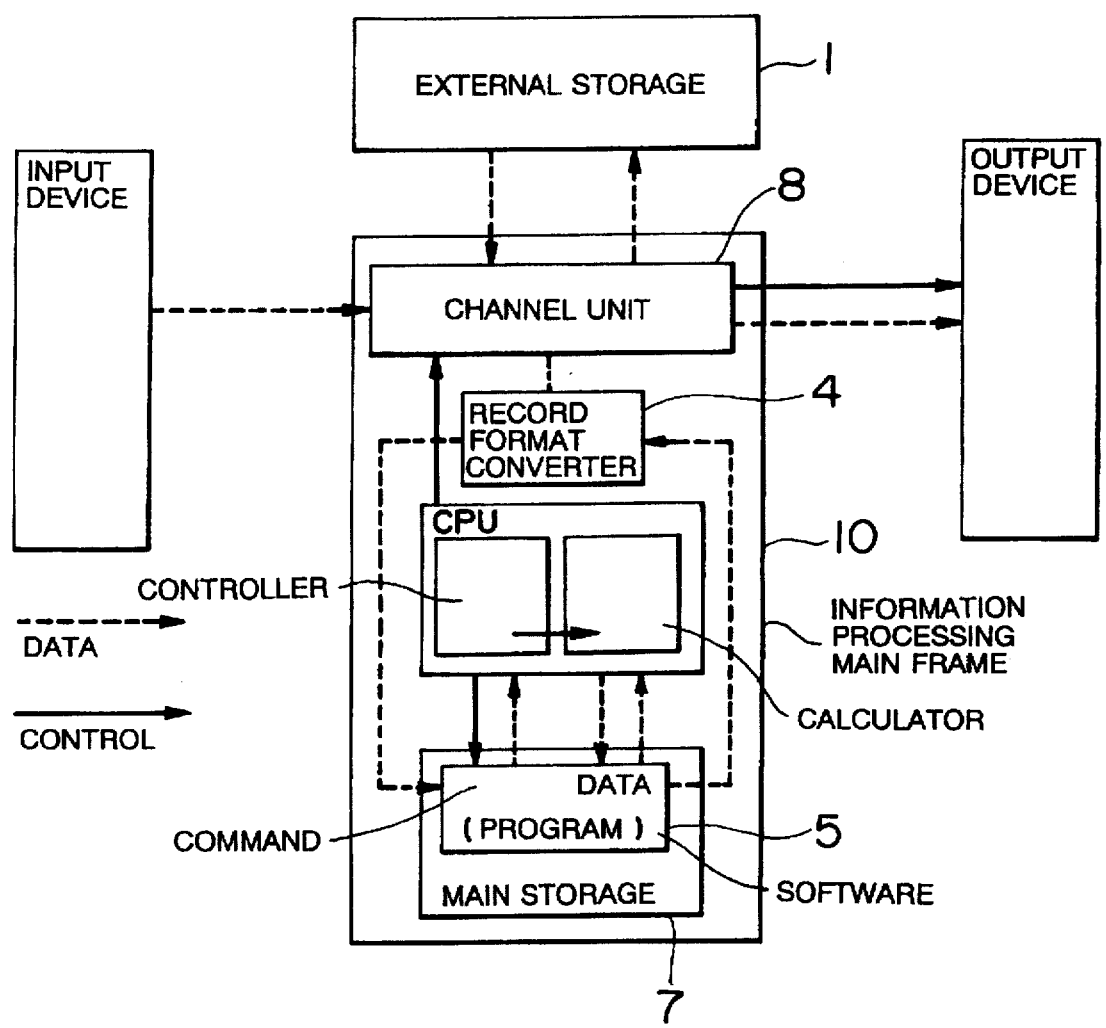
FIG. 1 is a diagram showing the principle of this invention.

FIG. 1 shows a computer system embodying this invention.

<General Construction>

The system of a first embodiment, as shown in FIG. 1, contemplates effective processing when inputting and outputting data with respect to an external storage 1 via a channel unit 8 and has a record format converter 4 situated in an information processing main frame 10 equipped with a CPU.

Figure 2:
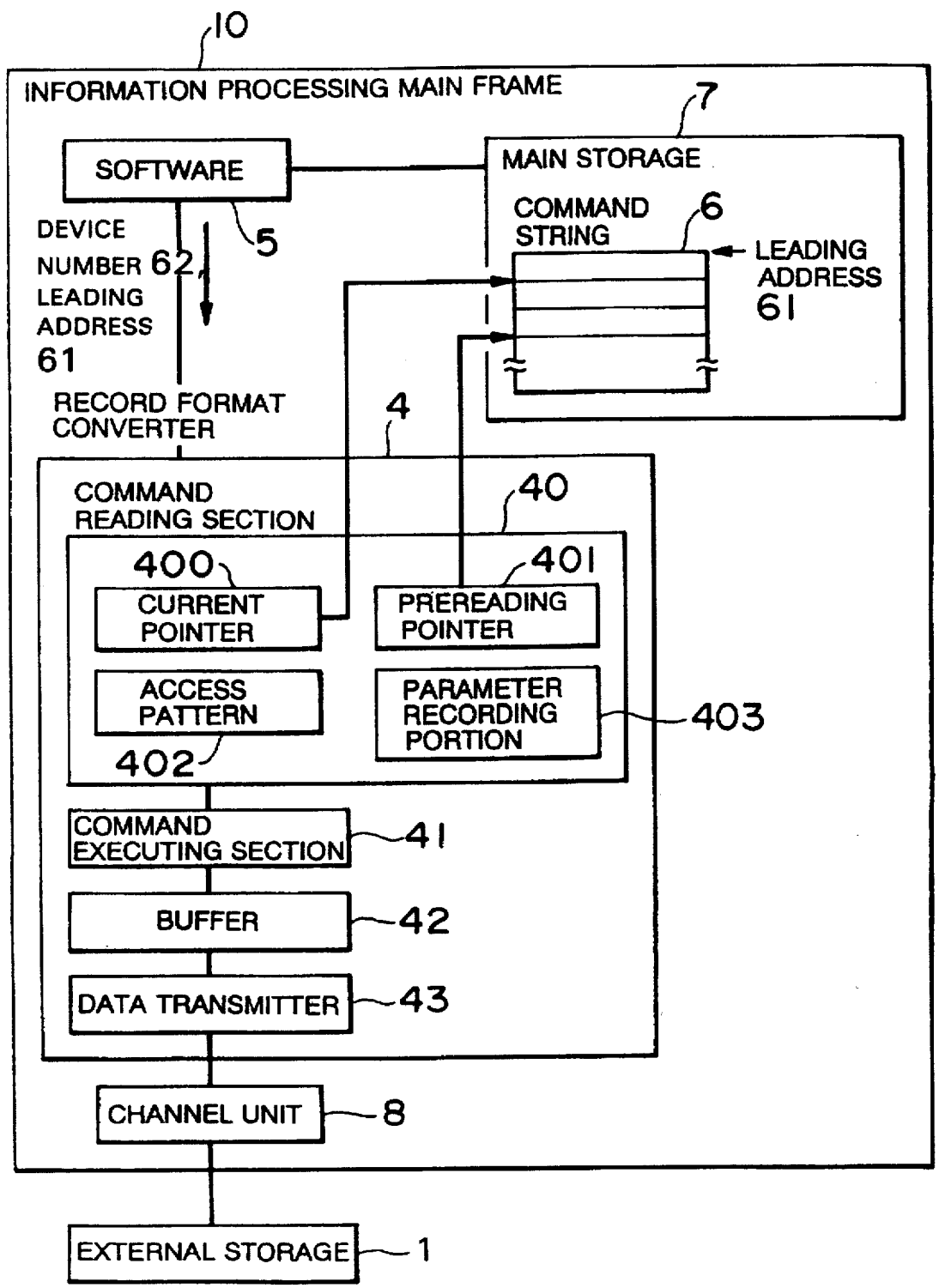
FIG. 2 is a block diagram showing a first embodiment of the invention.

FIG. 2 shows the system in greater detail. Provided on the CPU of a computer are software 5, a main storage 7, the record format converter 4 and the channel unit 8. The channel unit 8 is connected to the external storage 1 for writing and reading data. In this embodiment, the external storage 1 is a magnetic disk, which is a direct access storage device (hereinafter also referred to as DASD). Alternatively the external storage 1 may be any other storage such as an optical disk.

<Record Format Converter>

In the first embodiment, the external storage 1 deals with data of fixed length record format, while the software 5 deals with data of variable length record format. It is therefore necessary to secure compatibility in record format when software accesses data stored in the external storage.

When the software 5 accesses to the external storage 1, an instruction to the external storage 1 is described in an area on the main frame 10, i.e., the main storage 7 here. The instruction to the external storage 1 is a command string 6 including one or more commands. The area in which the instruction is to be described should by no means be limited to the main storage 7 and may be a dedicated device such as an I/O buffer storage.

The record format converter 4 is directly accessible to the main storage 7 in which command strings are stored. The record format converter 4 comprises a command reading section 40, a command executing section 41 for executing the command read by the command reading section 40, a buffer 42 connected to the command executing section 41, and a data transmitter 43 connected to the buffer 42.

When writing or reading to and from the external storage 1 data of variable length record format being dealt with on software, the record format converter 4 emulates the variable length record format of data as the fixed length record format, and then writing and reading takes place with respect to the track of fixed length record format in the external storage.

In this embodiment, not only the record portion of variable length record format but also other information to identify the record, e.g., a count portion, a key portion, are dealt with as fixed length data. This is emulation in the record format converter 4.

Specifically, in order to convert, for example, the variable length record, which is created by the software on the information processor side, into the fixed length record format in the magnetic disk device, the record format converter 4 has, as shown in FIGS. 3(a) and 3(b), a conversion table representing the contract of variable length record format and fixed length record format.

FIG. 3(a) shows the fixed length record format and FIG. 3(b) shows the variable length record format. A reference numeral 21 designates a fixed length data area in which fixed length data is to be recorded. A reference numeral 22 represents a count portion while reference numerals 23 and 24 represent, a key portion and a data portion, respectively.

This conversion table is provided for every different external storage having a different record format. In writing to the external storage, the record format converter converts the variable length record from the information processor into the fixed length record format with reference to the conversion table, and then the fixed length format is written in the external storage. On the contrary, in reading from the external storage, the record format converter converts the fixed length record from the external storage into the variable length record format with reference to the conversion table for use in application on the information processor.

The command reading section 40 has inside it a current pointer 400, a prereading pointer 401, an access pattern 402, and a parameter recording portion 403. The number of the access pattern 402 may be more than one.

<Operational Example of Embodiment>

The software 5 describes on the main storage 7 an instruction in the form of the command string 6 when accessing the external storage 1. Then, the software 5 gives the leading address 61 of the command string 6, the device number 62 of the external storage 1, etc., to the record format converter 4 when accessing the external storage 1.

When a processing request enters, the command reading section 40 of the record format converter 4 sets the leading address 61 of the command string 6 in the current pointer 400.

The command reading section 40 reads the commands on the main storage 7, which commands are designated by the current pointer 400, one after another, incrementing the current pointer 400. The command reading section 40 gives the commands to the command executing section 41 for execution.

The command executing section 41 performs conversion of the record format with respect to the data on the buffer 42 if the data to be accessed exists on the buffer 42. If the data to be accessed does not exist on the buffer 42, the data transmitter 43 gets access to the external storage 1 designated by the device number 62 and reads the corresponding data onto the buffer 42, whereupon conversion of the record format takes place.

When having read a command coincident with the leading command of the access pattern 402 from the address designated by the current pointer 400, the command reading section 40 compares the following commands with the access pattern 402 rather than supplying this command immediately to the command executing section 41.

Namely, the value of the current pointer 400 is set in the prereading pointer 401. The command reading section 40 reads the commands, which are designated by the prereading pointer 401, one after another, incrementing the prereading pointer 401. Then the command reading section 40 compares the individual command with the access pattern 402.

Simultaneously, for subsequent processing, the parameters of the read command are recorded in the parameter recording portion 403.

The command parameters represent operational conditions of the external storage, an address of the external storage and an address on the main storage, indicating the source and destination positions of data transfer.

If the preread command string has been found to be not coincident with the access pattern 402, the command reading section 40 stops prereading and supplies the command, which is designated by the current pointer 400, to the command executing section 41 where the commands will be executed one after another.

Even when the command coincides with part of the access pattern 402, the below-described processing in the case of coincidence takes place if high-speed processing is possible by batch processing.

If the preread command string coincides with one of the access patterns 402 for batch processing, the content of the batch processing is supplied to the command executing section 41 as commands for batch execution. At that time information on the parameter recording portion 403 is used as parameters.

If the preread command string coincides with the access pattern 402, it is needless to read from the external storage 1, default data is created on the buffer 42, and then the command designated by the current pointer 400 is supplied to the command executing section 41 for subsequent processing.

This access pattern is exemplified by the format processing of the whole track in the magnetic disk device.

For example, in the format processing in the magnetic disk device of variable length record format, it takes place on many occasions excluding certain fields, such as HA (home address) and R0 (record zero).

Because destruction of such information is not allowed, the processing without reading is impossible in this method. Thus in the processing, information such as HA and R0 is read from the external storage temporarily into the information processing main frame before processing, so that the original information remains in the external storage even when the information has been destroyed.

In this processing, since data reading is necessary for every processing, high-speed processing cannot be achieved. In this respect, the external storage is provided with an area in which the above-mentioned information is to be recorded, so that the information can be reserved in the readless processing even when the information has been destroyed by default data.

<Magnetic Disk Used As External Storage>

FIGS. 4(a) through 4(d) show the procedure of recording data on the magnetic disk.

Figure 4A:
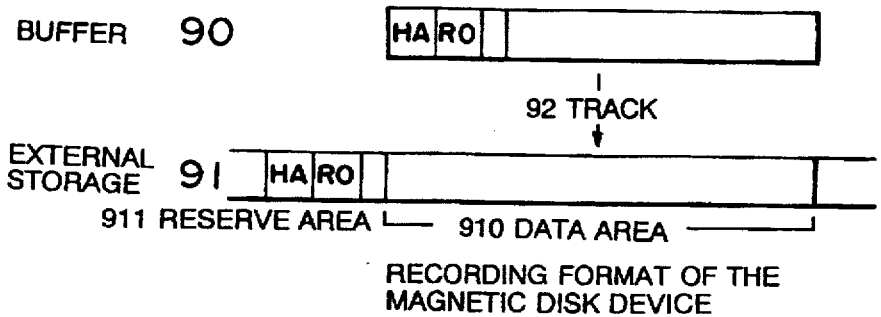
FIGS. 4(a) through 4(d) are diagrams showing the procedure of recording data onto a magnetic disk.

FIG. 4(a) shows the recording format of the magnetic disk device; 90 designates the record format on the buffer, and 91 designates the record format on the magnetic disk. The reserve area 911 in which HA and R0 are to be stored are formed immediately short of the data area in which the track 92 is to be stored on the magnetic disk.

Figure 4B:
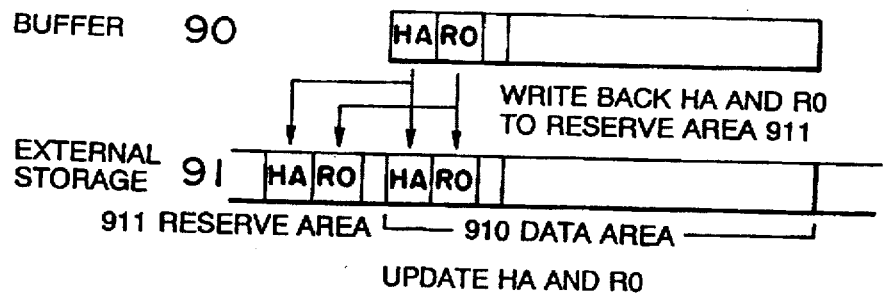

As shown in FIG. 4(b), if HA and R0 are updated, HA and R0 are written back to the data area 910 and, at the same time, are stored in the reserve area 911. Then when the format processing except HA and R0 takes place, HA and R0 are replaced by default data. At that time, the information will be only written back to the data area 910 and will not stored in the reserve area 911.

Figure 4C:
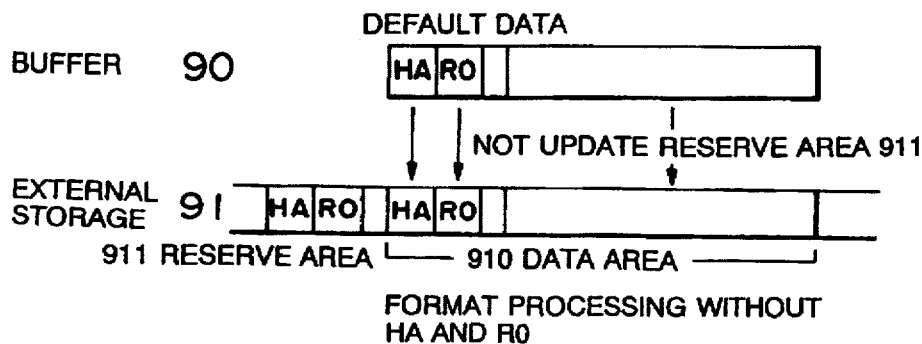

In reading the track, as shown in FIG. 4(c), the information of the data area 910 is read onto the buffer 90. At that time, for the information such as HA and RO reserved in the reserve area 911, the data of the reserve area 911 is used. The result is that when referring to HA, RO, etc., it is possible to use the previously updated data without any problem.

Thus providing the recording format converter on the information processing main frame makes it possible to deal with different external storage devices of different record formats at high speed by a single access device.

In particular, if this is used for accessing to a magnetic disk device, optical disk device, etc., of fixed length record format in the variable length record format, it is possible to use such a magnetic disk and an optical disk of fixed length record format, which is small in size and low in cost and enables high-speed processing, even from the software that could not deal with the conventional fixed-length-record-format magnetic disk device and optical disk unit. This makes the whole system high in performance, small in size and low in cost.

<Batch Processing of Channel Command>

Figure 5:
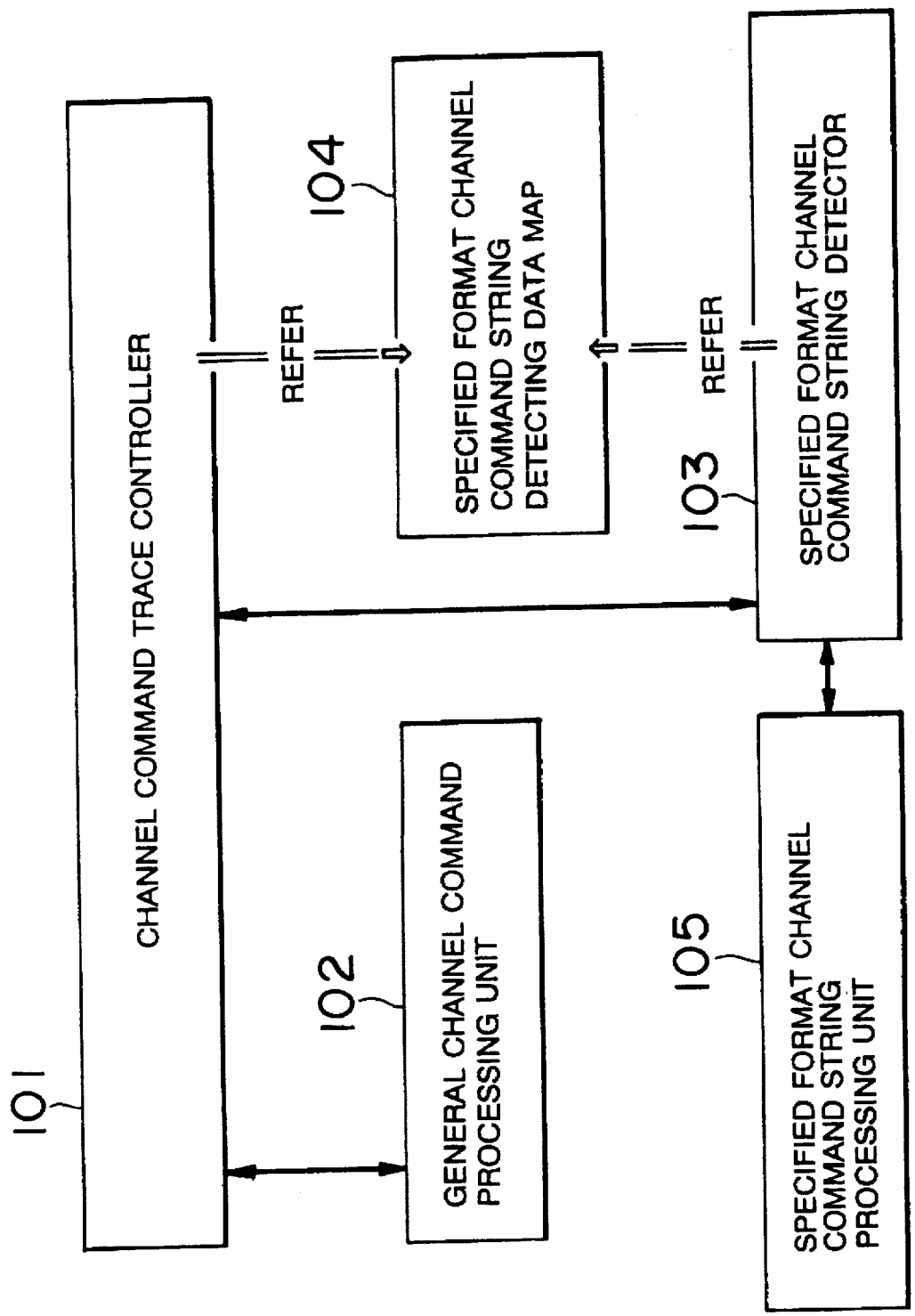
FIG. 5 is a detailed block diagram of a command reading section.

In this embodiment, as shown in FIG. 5, the command reading section 40 comprises a channel command trace controller 101, a specified format channel command string detector 103, and a specified format channel command string detecting data map 104 for detecting the specified format channel command.

The command executing section 41 has a general channel command processing unit 102 and a specified format channel command string processing unit 105. The command executing section 41 refers the specified format channel command string detecting data map, in which specified format channel command strings are previously registered as access patterns.

The channel command trace controller 101 performs trace controlling of the channel command string. The general channel command processing unit 102 is called from the channel command trace controller 101 upon reception of every channel command to perform simulation processing of the channel command.

Stored in the specified format channel command string detecting data map 104 are the data for use in discriminating whether or not the channel command trace controller 101 should call the specified format channel command string detector 103, and the data for use for the specified format channel command string detector 103 to discriminate whether or not the given channel command string is of a specified format.

The specified format channel command string detecting data map 104 is a specified format command string register section for registering specified format command strings previously.

If the given channel command string has been judged as the specified format channel command string, the specified format channel command string processing unit 105 performs batch simulation of the specified format channel command string. This is a so-called batch processing of the present invention.

<Channel Command Processing>

By referring to the specified format channel command string detecting data map 104, the channel command trace controller 101 discriminates whether the channel command is the leading channel command of the specified format channel command string.

If the channel command trace controller 101 determines that the channel command is the leading channel command of the specified format channel command string, the specified format channel command string detector 103 is called.

The specified format channel command string detector 103 discriminates whether the channel command string is the specified format channel command string by referring to the specified format channel command string detecting data map 104.

If the channel command trace controller 101 determines that the channel command string is the specified format channel command string, the specified format channel command string processing unit 105 is called.

The specified format channel command string processing section 105 processes the specified format channel command string in batch.

If the channel command trace controller 101 determines that the channel command string is not the specified format channel command in any condition, simulation processing of the channel command is performed by calling the general channel command processing unit 102 repeatedly from the channel command trace controller 101.

Therefore, the processing of the specified format channel command string would become reduced in number of dynamic steps as compared with when using the general channel command processing unit 102, thus causing the high-speed processing.

In this embodiment, using the specified format channel command string detector 103 of FIG. 5 and the specified format channel command string detecting data map 104, the specified format channel command string is detected, and the many channel command strings issued by the operating system are simulated by the specified format channel command string processing unit 105.

Therefore, if the channel command string is the specified format channel command string, it is unnecessary to perform simulation processing using the general channel command processing unit 102 repeatedly, so that the number of control transfers can be reduced and plural command strings can be processed in the predetermined format.

As compared to when performing simulation processing by the general channel command processing unit 102, it is possible to reduce the number of dynamic steps and to increase the speed of simulation processing of the channel command string.

Figure 6:
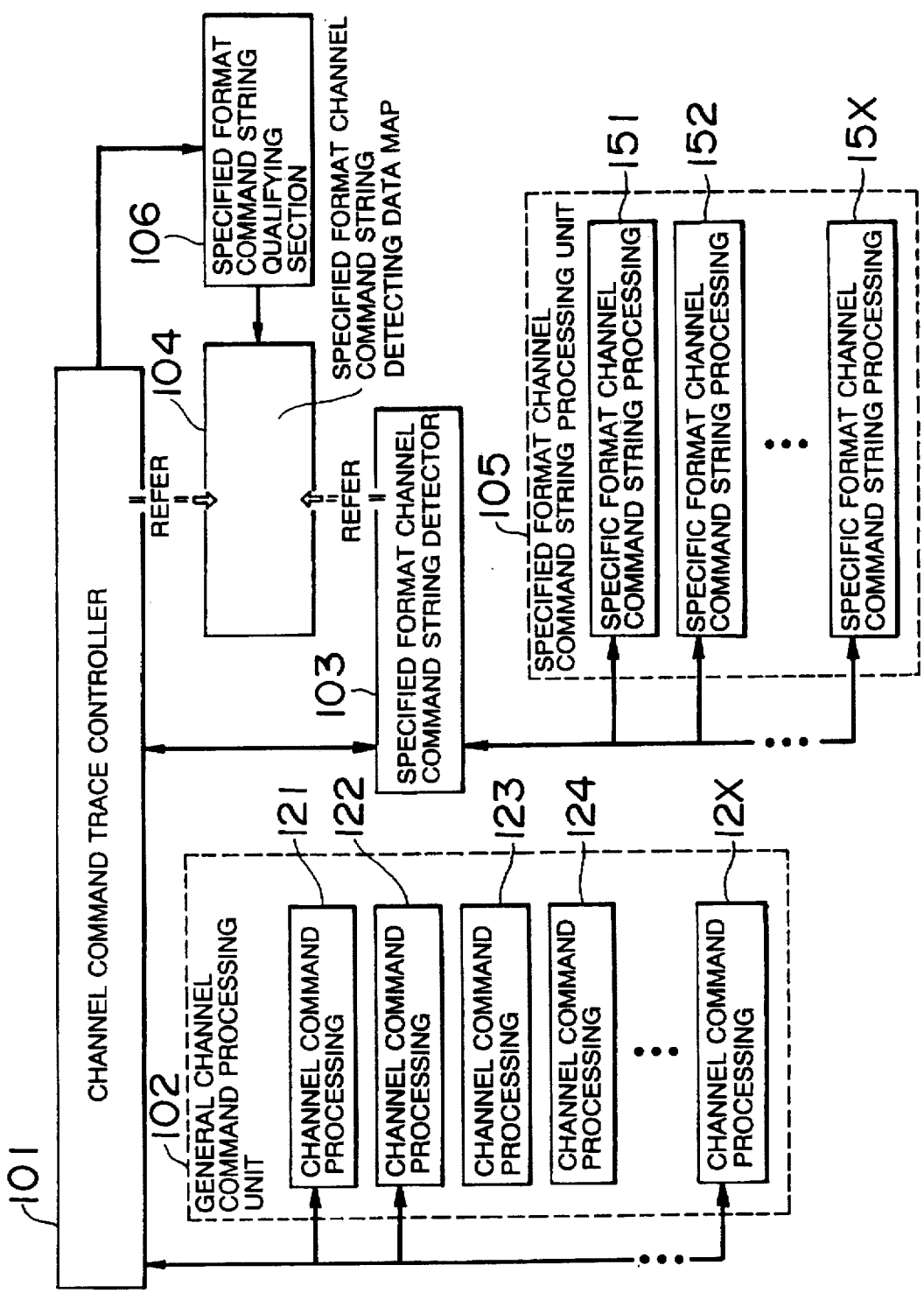
FIG. 6 is a more detailed diagram of FIG. 5.

FIG. 6 shows the program for simulation processing of the channel command string. In FIG. 6, the parts or elements similar to those of FIG. 5 are designated by the same reference numerals. Reference numerals 121 through 12x indicate the channel command processing, and more particularly the process units of different types of the general channel command processing units. Reference numerals 151 through 15x represent specified format channel command string processing, each indicating a processing unit depending on the type of the specific format channel command processor.

In FIG. 6, a reference numeral 106 designates a specified format command string qualifying section for detecting a pattern of the individual command string, for qualifying, if this pattern has appeared repeatedly, the command string of the same pattern as the specified format command string and for entering that command string in the specified format channel command string detecting data map 104, which serves as the specified format command string register section.

Figure 7:
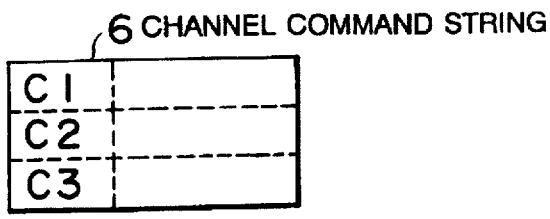
FIG. 7 is a diagram showing a channel command string created by an operating system.

FIG. 7 shows a channel command string created by the operating system. C1 through C3 in the channel command string 6 designate command codes of the channel commands.

Figure 8:
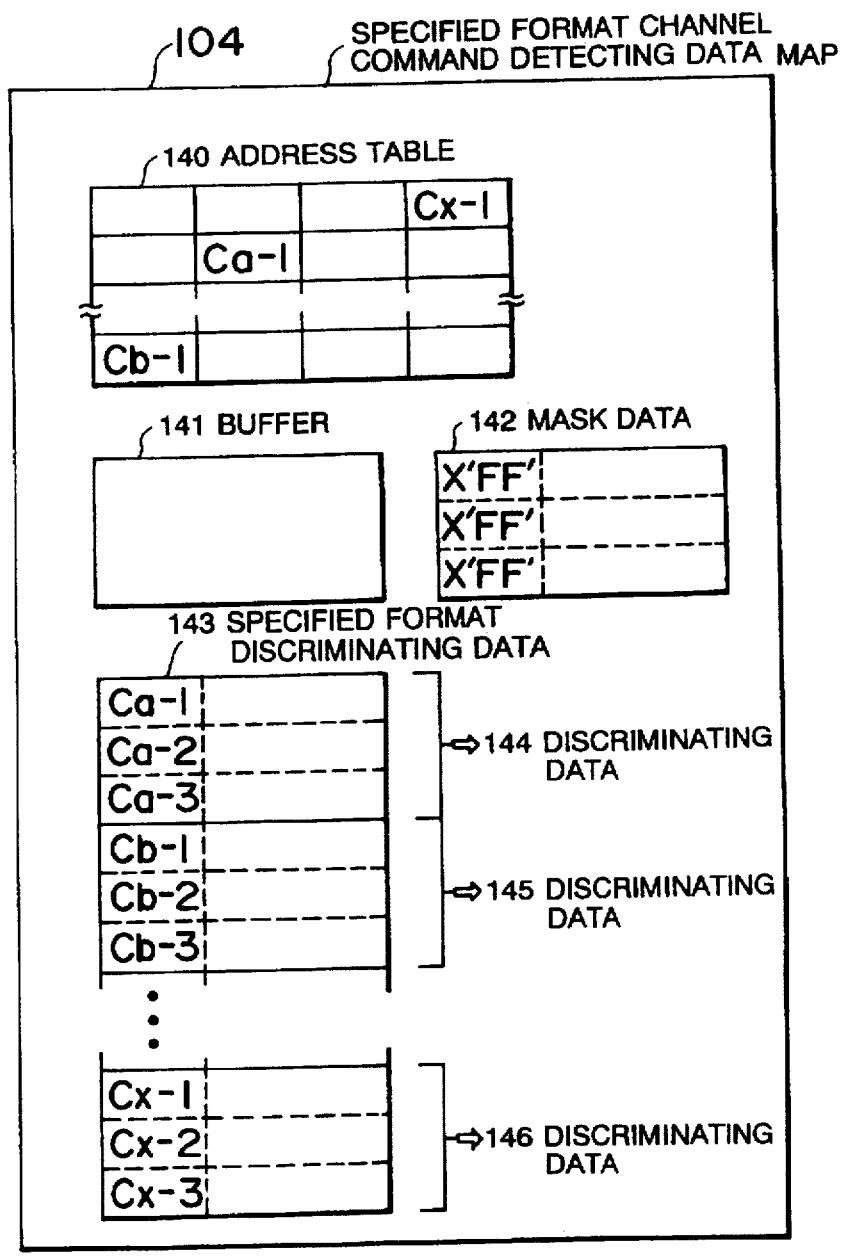
FIG. 8 is a detailed diagram showing a data map for detecting a specified format channel command.
Figure 9:
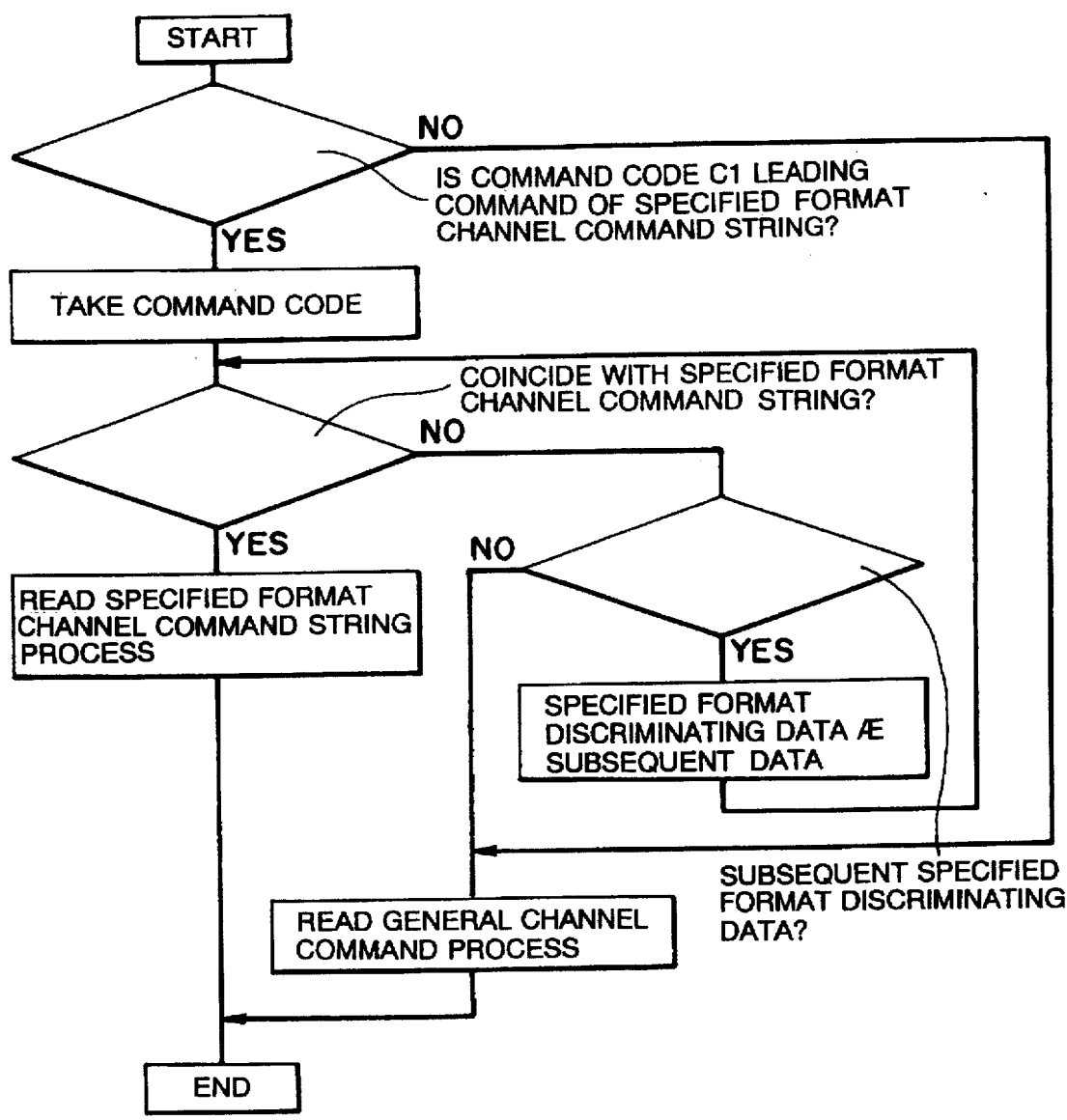
FIG. 9 is a flow diagram showing simulation of a channel command string.

FIG. 8 is a detailed diagram of the specific format channel command detecting data map.

A reference numeral 140 designates an address table which has elements corresponding to the number of channel command codes and on which call addresses of the channel command processing 121 through 12x corresponding to the respective command codes.

Further, in the address table 140, call addresses of the specified format channel command string detector 103 are stored in association with the leading command codes of the specified format channel command strings.

A reference numeral 141 designates a buffer serving as a working area for detecting the specified format channel command string.

A reference numeral 142 designates mask data which takes a logical product with the channel command string to pick up only the command codes. The term "mask data" used herein is a bit example having the same size as the specified format channel command string, and it is assumed that the bit of position not compared to detect the specified format channel command string is 0.

A reference numeral 143 designates specified format discriminating data in which a number of specified format channel command string discriminating data are stored.

Reference numerals 144 through 14x designate discriminating data in which values are not set at portions other than the command codes and which is a unit to be actually compared with the channel command string 6. The discriminating data 144 through 14x corresponds with the specified format channel command string processes 151 through 15x, respectively. For example, setting-up is such that if the channel command string 6 coincides with the specified format channel command of the discriminating data 144, the specified format channel command string process 151 will be called.

As the discriminating data, the specified format channel command strings are registered. This specified format channel command string is a command string to be processed frequently in order. The format process of the whole track in the magnetic unit is exemplified as follows:

(1) SEEK (track designation)
(2) SEARCH ID EQUAL (record search instruction and record 0 is designated by parameter)
(3) TRANSFER IN CHANNEL (transfer control in channel (2))
(4) WRITE CKD (create 1 record).

<Simulation Process of Channel Command String>

The simulation process of the channel command string 6 will now be described with reference to FIGS. 6 through 9. Firstly, the channel command trace controller 101 detects the leading command code C1 of the channel command string 6 and the destination address stored in the field corresponding to the command code C1 in the address table 140.

Since an address of the specified format channel command string detector 103 is set in the destination address, the specified format channel command string detector 103 will be called.

If it is not the leading command code of the specified format channel command string, the command code C1 calls any of the channel command processes 121 through 12x.

The specified channel command string detector 103 picks up only the command codes C1 through C3 from the channel command string 6 by obtaining a logical product with the mask data 142, and stores the command codes in the buffer 141.

Then the buffer 141 is compared with the discriminating data 144 in the specified format discriminating data 142.

If the command codes C1 through C3 coincide with the command codes Ca-1 through Ca-3, the specified format channel command string process 151 corresponding to the discriminating data 144 will be called and then the processing of the channel command string 6 will take place batchwise.

On the contrary, if the command codes C1 through C3 do not coincide with the command code Ca-1 through Ca-3, data subsequent to the discriminating data 145 will be checked in the same process as the discriminating data 144.

This checking will continue up to the discriminating data 14x.

If the command codes C1 through C3 do not coincide with any of the discriminating data 144 through 14x, any of the channel command processes 123 through 124 corresponding to the command code C1 will called.

Embodiment 2

In the foregoing embodiment, only the command code check is made with respect to three channel commands. According to the second embodiment, by providing the mask data 142 in a portion other than the command code, it is also possible to check the flag, data address and data length. The length of the channel command string to be compared should by no means be restricted, causing the same result.

Embodiment 3

In the first embodiment, specified format channel command strings as references are previously registered in the specified format channel command detecting data map. If the channel commands to be compared is the specified format channel command string, these channel commands will be processed batchwise at high speed. The first embodiment has been proposed considering the conventional problem that since routine channel commands to be executed frequently are processed one after another, effective processing could not be achieved.

From this point of view, even if the given channel command is not the previously registered channel command string, the channel command is registered in the specified format channel command detecting data map as a new specified format channel command string after repeating the same channel command a predetermined number of times. Then, such a channel command string can be processed in batch, improving the processing efficiency. For this purpose, a command string is recognized, and the number of executions is counted by a counter. When the content of the counter reaches a predetermined value, a command register section enters the channel command in the specified format channel command detecting data map.

In this embodiment, it is particularly meaningful that the command string to be frequently processed is processed batchwise rather than executed successively.

When commands, i.e., an instruction to search for "a" of a first track, an instruction to search for "a" of a second track and an instruction to search for "a" of a third track have been received in directory searching, these three instructions are combined into a single composite instruction spanning over the three tracks and are hence executed in batch. If read 1 record, read 1 record and read 1 record, namely, three identical read instructions are received in sequence, it is possible to execute these three instructions in batch after converting them into a single composite instruction. This concept may be applied to the batch processing of instructions spanning over a number of volumes.

Further, assume that software has read data from two tracks onto the buffer. This means that the data has been read twice internally; however, the total data read by the buffer can be processed as if the data has been read only one time.

As mentioned in the foregoing description, according to the present invention, it is possible to reduce the simulation time in processing a specified format channel command string and to improve the performance of simulation of channel commands.

For effective use of computer resources, it has been demanded that a number of operating systems are operated by a single computer. With this respect, a virtual computer has been suggested. However, in order to realize a virtual computer, it is necessary to perform high-speed simulation processing of a CPU instruction and an I/O instruction, such as a channel command string which is an input-output request.

In the conventional simulation processing of channel command strings, for the purpose of performing the processing to cope with various formats of channel command strings created by the operating system and for the purpose of simply creating a control theory for the whole simulation processing, there is used a program for performing simulation for each of different kinds of channel commands, such as a read command, write command and a positioning command. In the conventional art, after the channel command trace controller for tracing the channel command string has detected the channel commands to be simulated and has called the process for the corresponding kind of channel commands, simulation of these channel commands takes place. Upon completion of this simulation, the channel command trace controller will detect the next channel command and will call the process for the channel command of the corresponding kind, and such detecting and calling processes will be repeated as long as the channel command chain continues.

However, since the channel command string created by the operating system has a common format and a fixed sequence for the channel commands, namely, has channel commands of a specified format on many occasions, the channel command trace controller calls the same channel command processes by the same sequence in view of the structure of the simulation processing.

Consequently, even when processing a specified format channel command string, it is necessary to perform calling of the individual channel command process and error checking for every command like the processing for general format channel commands. The calling and checking processes are unnecessary to process a specified format channel command string. With this conventional art, the simulation processing of a channel command string would take too much time.

Whereas, according to the system of this invention, partly since simulation processing of specified format channel command strings is performed efficiently and partly since the number of dynamic steps is reduced, it is possible to increase the rate of simulation processing of the channel commands.

Embodiment 4

Figure 10:
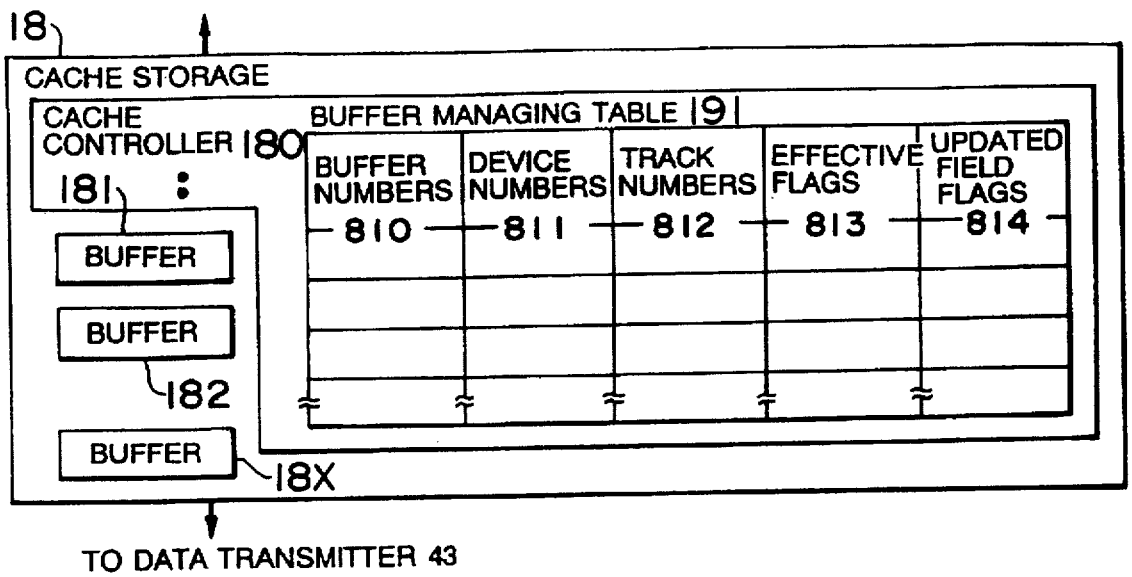
FIG. 10 is a diagram showing a fourth embodiment.

In a fourth embodiment, as shown in FIG. 10, a cache storage 18 is substituted for the buffer 42 of FIG. 2. The cache storage 18 comprises a cache controller 180 and a number of buffers 182, 183, . . . 18x. The cache controller 180 manages the data of the buffers 182, 183, . . . 18x according to a buffer managing table 191. The buffer managing table 191 includes buffer numbers 810, device numbers 811, track numbers 812, effective flags 813 and updated field flags 814.

The operation of the system of the fourth embodiment will now be described.

If the process with respect to a new track is necessary when executing the commands, the command executing section 41 requests the cache controller 180 of the cache storage 18 for the track. The cache controller 180 retrieves buffer information blocks of the buffer in which the track requested by the buffer managing table 191 is stored. When the requested track has been detected, the cache controller 180 will notify the command executing section 41 of the buffer number.

Otherwise, after the requested track has been read onto an arbitrary buffer 42, necessary information is set on the buffer managing table 191.

If updating has been made with respect to an arbitrary field such as by writing, the command executing section 41 presents the updated field flag 814 corresponding to the updated field. Upon completion of the sequential processes of the command strings 6, the command executing section 41 will write the data of the field corresponding to the updated flag 814 of the updated buffer back to the external storage and will reset the updated flag 814.

Now assuming that the write-back processing has been performed abnormally due to any fault which occurred in the external storage, the updated data on the buffer does not coincide with the content of the external storage. Consequently, in the presence of the fault, the cache controller 180 resets on the buffer managing table 191 the effective flag 813 of the buffer to which the write-back processing is to be executed, indicating that the content of the buffer is invalid.

Embodiment 5

Figure 11:
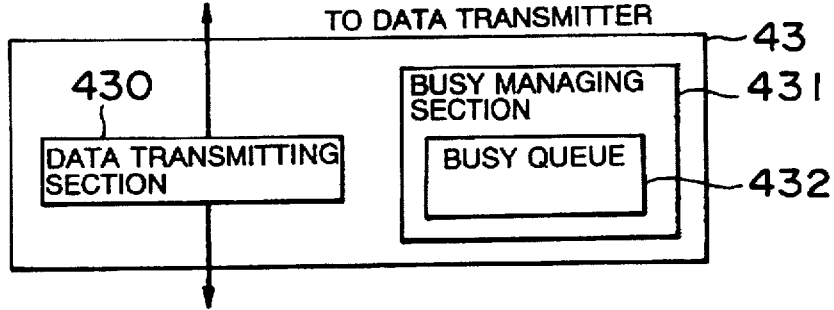
FIG. 11 is a diagram showing a fifth embodiment.

FIG. 11 shows a fifth embodiment. In the fifth embodiment, unlike the first embodiment, a busy managing section 431 having a busy queue 432 is provided in the data transmitter 43, which is an access managing circuit. If the processing has been impossible as the channel and/or external storage become busy when accessing the external storage, the busy managing section 431 connects the information concerning the access with the busy queue 432.

Then, when a busy release report has been made from the external storage, the busy managing section 431 will re-access the external storage indicated by the access information of the busy queue 432. If a number of accesses exist in the busy queue 432 while only a single device such as the channel is busy, re-access requests will be issued successively in the order of the busy queue 432.

Embodiment 6

Figure 12:
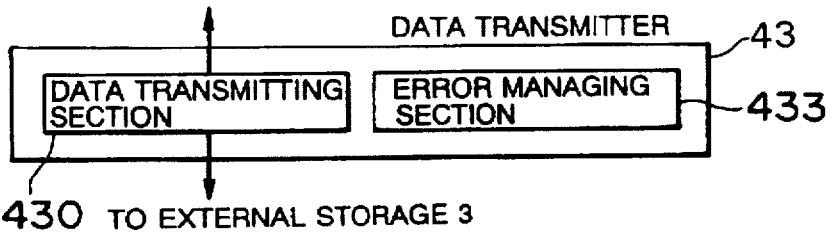
FIG. 12 is a diagram showing a sixth embodiment.

FIG. 12 shows a sixth embodiment which is a modification of the first embodiment. An error managing section 433 is provided in the data transmitter 43. If an error has occurred when accessing the external storage, the error managing section 433 will analyze the error information and, if the error can be cleared by retry, it will reissue the access request. Otherwise, the error managing section 433 will execute the process to cope with the reported error and thereafter will report of this error software. It is therefore possible to reduce the number of error reports to software.

Embodiment 7

Figure 13:
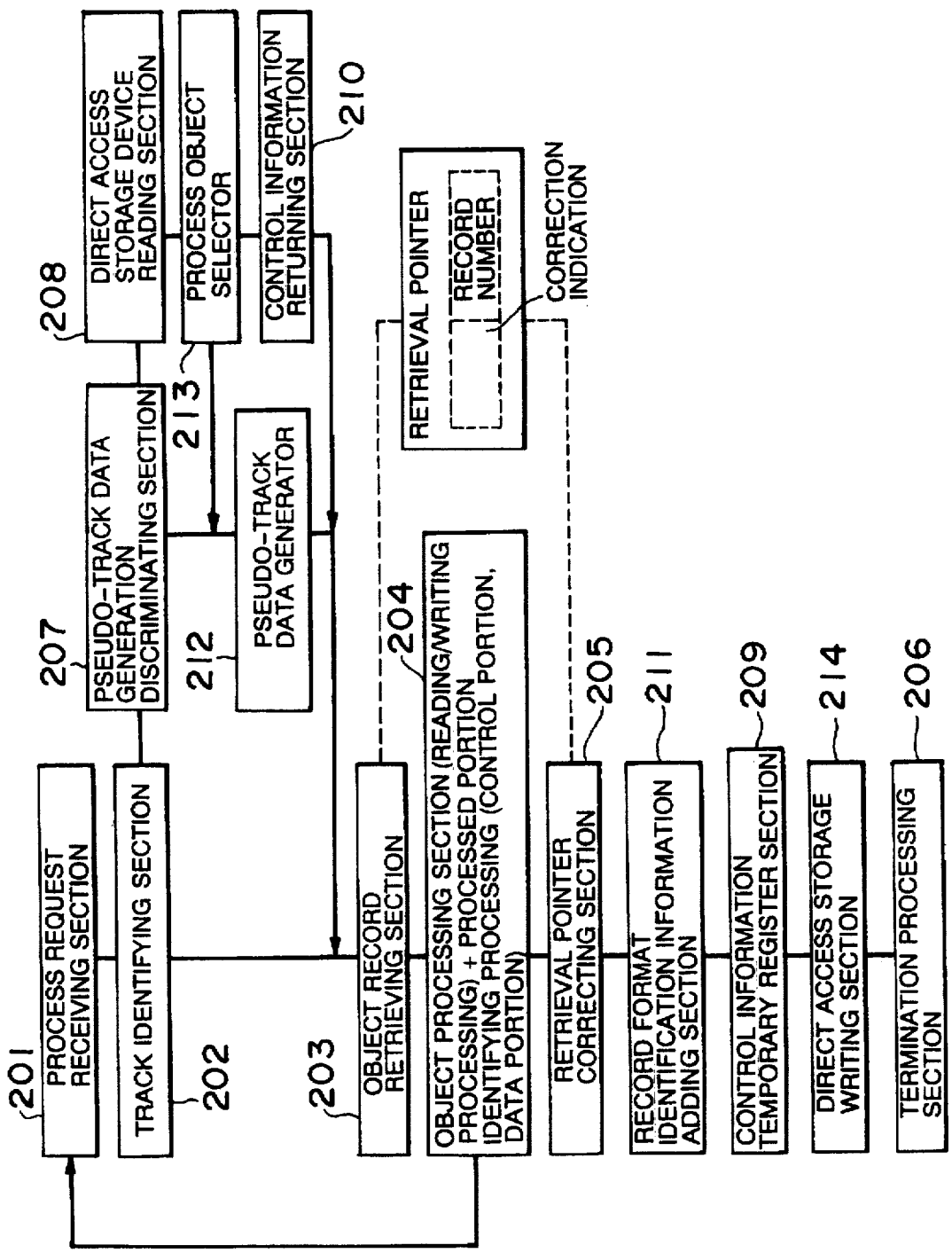
FIG. 13 is a functional block diagram showing a seventh embodiment.
Figure 14:
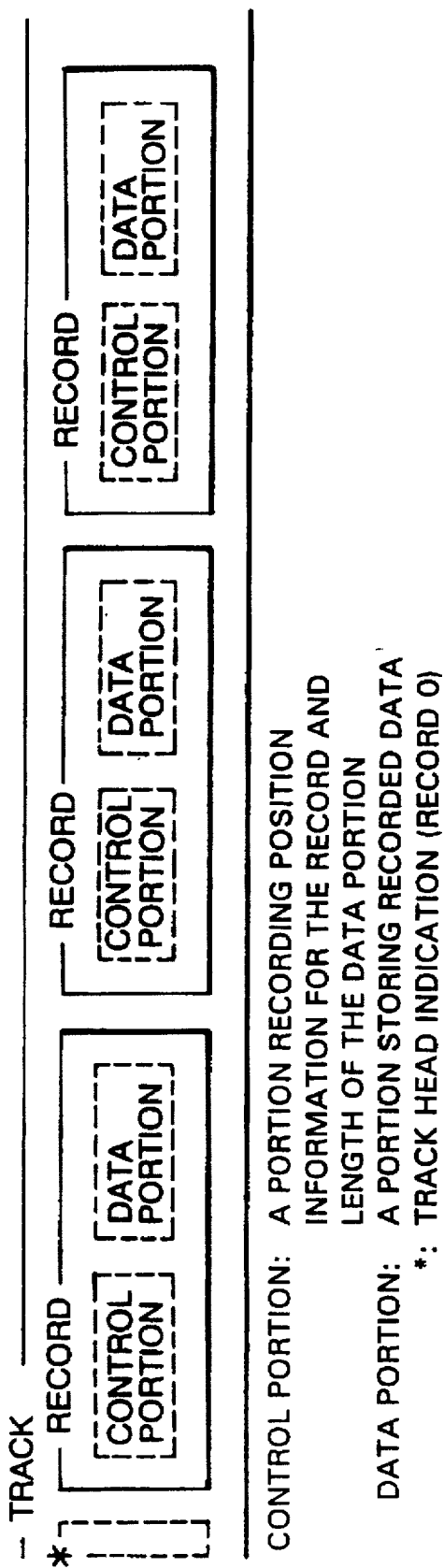
FIG. 14 is a diagram showing the record status of a track.
Figure 15:
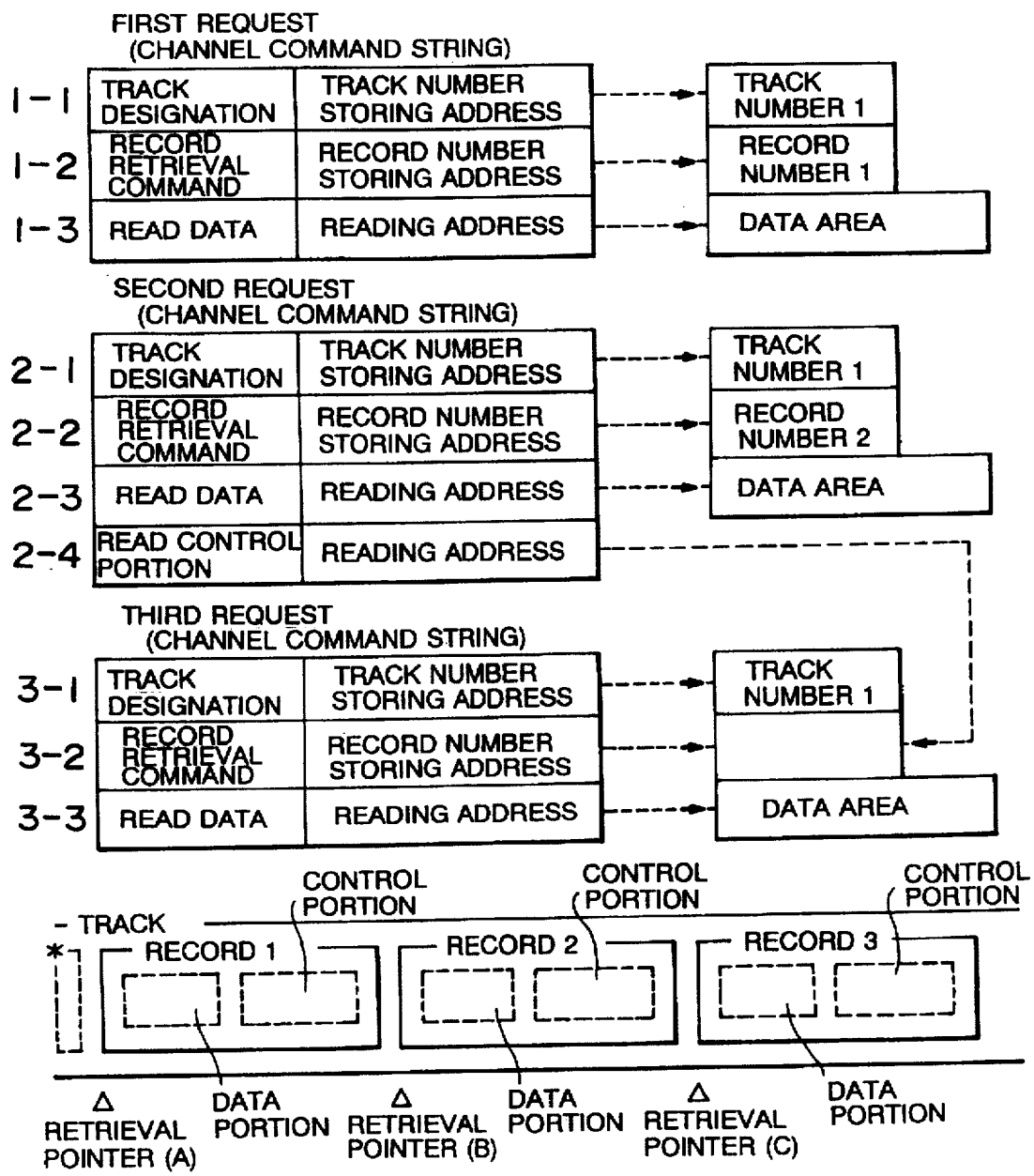
FIG. 15 is a diagram showing the processing of the seventh embodiment.

FIGS. 13 through 15 show a seventh embodiment. The seventh embodiment realizes the processing of the first through sixth embodiments not only for each track but also for plural tracks.

In the conventional track emulation processing, a channel command for retrieving the object record in the DASD channel command composed by application is received, and then the records of the track expanded on the memory are examined successively from the leading record to retrieve the object record. If the track to which the access request is made is not expanded on the memory, the requested track data is temporarily read from the direct access storage device to the memory, whereupon the processing for retrieving the object record is expanded.

However, processes to be requested by application are sequential record processes on many occasions; that is, when one request processes one record, then the next request processes the next record, and the subsequent records on the track are processed successively in the order of requests. In this case, the system for retrieving the object record from the leading position of the track upon reception of every request would increase the overhead for every retrieval.

If the records of a track are to be rewritten one after another from the leading record by new data, according to the conventional art, the track is temporarily read from the direct access storage device to the memory before restarting the processing, for the reason that the track is not expanded on the memory. As a result, the temporarily read data will be waste and will be rewritten by the requested new data.

Accordingly, wasteful retrieving and reading took place in sequential record processing requested by many applications as well as data creating processing which rewrites the whole data in the track by new data, data returning processing and data initializing processing. Therefore high-speed data processing was difficult to achieve.

Therefore effective track emulation processing and reduction of overhead as well as wastefree access to the direct access storage device, which increases the processing rate, are demanded.

The seventh embodiment meets this demand.

FIG. 13 shows the structure of the seventh embodiment.

As shown in FIG. 13, the system generally comprises a process request receiving section 201 for receiving a request (channel command string) from application, a track identifying section 202 for identifying whether or not the requested track data is already expanded on the memory, an object record retrieving section 203 for retrieving the object record in the track using a retrieval pointer as called after the track data is expanded on the memory, an object processing section 204 for processing the object record, a retrieval pointer correcting section 205, a termination processing section 206, a pseudo-track data generation discriminating section 207, a direct access storage device reading section 208, a control information temporary register section 209, a control information returning section 210, a record format identification information adding section 211, a pseudo-track data generator 212, a process object selector 213, and a direct access storage writing section 214.

Upon receipt of a request (channel command string) from the application, the process request receiving section 201 makes emulation instructions one after another respectively for a number of channel commands.

The track identifying section 202 discriminates whether or not the requested track is already expanded on the memory, and transfers control to the object record retrieving section 203 if it is expanded and to the pseudo-track data generation discriminating section 207 if it is not expanded.

If the track data is expanded on the memory, the object record retrieving section 203 retrieves the object record in the track as called after the track data is expanded. At that time the retrieving pointer is used.

The object processing section 204 reads/writes the data by executing the process with respect to the object record. However, if only the control portion (portion in which the position information of the record is recorded, as shown in FIG. 14) of the object record is read, and if it is the last process (no subsequent channel command exists), correction of the pointer will be indicated for the purpose described below.

Further, if the requested process continues (any succeeding channel command exists), control will be returned to the process request receiving section 201 to repeat the necessary process.

The retrieval pointer correcting section 205 advances the retrieval pointer by one (positioning the pointer at a record next to the last processed record) after the object record is processed.

If the last process from the application is getting access to the control portion of the record (if there is the indication of pointer correction), the retrieval pointer is returned to the original position (repositioning to the last processed record). If the control portion of the record is read finally, the next request from the application is occasionally to retrieve the object record using this information. That is, while a record is processed (read/written), the control portion of the next record is read to terminate the processing. While an instruction to execute the next request is issued, the data of the record (the record in which the last read control portion exists) is processed using the information (record positioning information) of the last read control portion.

Since the last processed record is retrieved again by the next request instruction, the retrieval pointer is returned to the original position. It is therefore possible to retrieve the object record at high speed.

The control information temporary register section 209 reserves control data in the reserve area 911 of the external storage when the control data is updated.

The control information returning section 210 copies the control information to the proper position, in which the control data should originally exist, on the buffer when reading the track.

In recording the data in the external storage, the record format identification information adding section 211 adds to the control information identification information indicating the record format into which the data has been converted.

The process object selector 213 decides the data record format by referring to the identification information added by the record format identification information adding section, and discriminates whether or not the decided record format is identical with the record format of the process object.

If the process object selector 213 determines that it is not the record format of the process object as the record format of the data, the pseudo-track data generator 212 generates pseudo-track data with the data area remaining unrecorded.

The direct access storage device writing section 214 has a memory for temporarily storing the data read from the external storage. When an instruction is received from software to read data to the external storage after reading the data from the external storage temporarily to the memory, the direct access storage device writing section 214 will not perform reading of the data with respect to the external storage but with respect to the memory and will write the data back to external storage after the processing on the memory has been completed.

The termination processing section 206 transfers control to the request-source application when the requested channel command string has been completely emulated.

When called from the track identifying section 202, the pseudo-track data generation discriminating section 207 discriminates whether or not the requested track data should be read from the direct access storage device. This is to discriminate whether or not the request (channel command string) to the track is a request for rewriting the track from the leading record. The request is identified by tracing the channel command string for which an instruction is issued by the process request receiving section 201. If the request has been judged as a request for rewriting the whole data, the pseudo-track data generation discriminating section 207 will transfer control to the pseudo-track data generator 212 without performing waste reading from the direct access storage device. Then the pseudo-track data generator 212 will generate track data in dummy on the memory and will return control to the object record retrieving section 203. The pseudo-track data generation discriminating section 207 has a command identifying section for discriminating whether or not the given channel command string is a request for rewriting the whole data of the track from the leading record to the end record.

The direct access storage device reading section 208 reads the requested track data from the direct access storage device to the memory and transfers control to the process object selector 213. If the process object selector 213 determines it is not the record format of the process object directed to processing, the process object selector 213 transfers control to the pseudo-track data generator 212, and if judged otherwise, then it transfers control to the control information returning section 210 and returns control to the object record retrieving section 203.

In this embodiment, as shown in FIG. 13, using the retrieval pointer correcting section 205 and the pseudo-track generation discriminating, section 207, the retrieving of the object records with respect to the sequential record processes requested by the many application processes can be performed instantly by the action of the retrieval pointer. Further, in creating, returning or initializing data, waste reading from the direct access storage device can be prevented by the action of the pseudo-track data generation discriminating section 207, thus increasing the rate of track emulation process drastically.

As the secondary action of the retrieval pointer correcting section 205, assuming that a record is initialized in the case of the direct access storage device, succeeding records will necessarily be erased. However, when initializing a record in the track emulation processing, it is possible to prevent the succeeding records from being erased by holding the retrieval pointer as a last process record pointer. Namely, if the last effective record position in the track is held by the pointer, it is unnecessary to take the trouble to erase the succeeding records, thus resulting in high-speed processing.

The foregoing description will be expanded with reference to FIG. 15. The general process will be explained also in connection with FIG. 12. The first request from the application is a request to retrieve the record number 1 of the track number 1 and to read the data portion of the record.

In the channel command string indicated by the first request, the track identifying section 202 recognizes the track to access as the track of number 1 by the command 1-1 and discriminates whether or not the track data is expanded on the memory. Here it is assumed that it is already expanded.

Then by the command 1-2, the object record retrieving section 203 recognizes that the record of the record number 1 of the track is to be retrieved, and then retrieves within the track number 1 on the memory using the retrieval pointer.

As shown in FIG. 15, the initial value of the retrieval pointer is 1. The control portion of the record number 1 indicates that is the object record. Then by the command 1-3, the object processing section 204 recognizes that the data portion of the record is a request for a reading process and transfers the content of the data portion to the designated address.

Since the first request has thus been completed, the retrieval pointer correcting section 205 updates the content of the retrieval pointer by adding 1 to the record number (1) of the last processed record, 1+1=2 as shown in FIG. 15.

The second request from the application is a request to retrieve the record number 2 of the track number 1 and to read the data portion of the record. Accordingly, the processing takes place in the same procedure as the foregoing. At that time, since the retrieval pointer is updated to 2 after completion of the first request, the record of the record number 2 can be retrieved instantly when retrieving within the track number 1 on the memory.

Further, in the case of the second request, since a request to read the control portion of the next record is added by the last command, the information of the control portion of the record number 3 is transferred to the designated address to perform the indication of pointer correction. Thus the second request has been completed.

In this case, in the retrieval pointer correction process, partly since 1 is not added to the record number (3) of the last processed record and partly since indication of correction takes place, the retrieval pointer is kept set at the latest processed record of the record number (3), as shown in FIG. 15.

The third request from the application is a request to retrieve the record (=record number 3) indicated by the content of the last read control portion and track number 1 of the second request and to read the data portion of the record. Accordingly, the processing takes place in the same procedure as the above. At that time, since the retrieval pointer is corrected to 3, it can retrieve the object record instantly within the track number 1 on the memory.

In this embodiment, the information processing main frame has a memory. If the command is a request to process the whole blocked data, the blocked data is not read from the external device, and default data (pseudo-track data) is created on the memory. Then the processing is performed with respect to the default data. Therefore it is possible to increase the processing rate.

However, if the command is a request to reload the whole track, the data will necessarily be rewritten even when the data of the track is read from the disk.

To this end, in this embodiment, if the command is decided as a request to reload the whole track, default data (pseudo-track data) is created by the pseudo-track generation discriminating section 207. Then the processing is performed with respect to the default data.

The process of reloading the whole track is thus performed efficiently. Practically, however, the control information, i.e., HA (home address) and R0 (record 0) which exists at the leading end of the track, is left unchanged, and the record succeeding R1 (record 0) is rewritten.

In this case, if a pseudo-track is merely created, the control information will be destroyed. Consequently, in this embodiment, as shown in FIG. 4, a reserve area 911 for reserving the control information is defined on the external storage. Further, the system of this embodiment further has the control information temporary register section 209 for reserving the control information in the reserve area when the control information is updated, and the control information returning section 210 for copying the control information to the proper position, in which the control information should originally be located, on the buffer when reading the track.

If the control information has been updated as shown in FIG. 4(b), the control information temporary register section 209 writes the control information also in the reserve area 911 when writing the track data.

If the whole data of the track except for the control information has been rewritten as shown in FIG. 4(c), the control information of the track is reserved in the data area 910 on the external storage as the content of the pseudo-track data, i.e., faulty information.

Figure 4D:
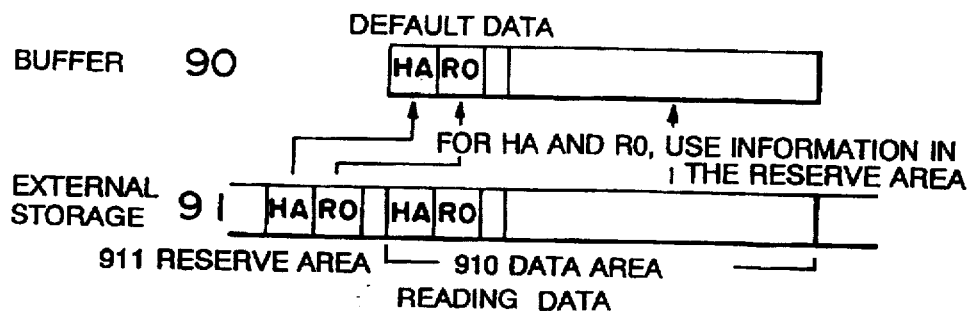

However, since the correct control information is stored in the reserve area 911 on the external storage, the control information returning section enables the control information to use the control information portion of the reserve area 911, as shown in FIG. 4(d) when reading the track. Thus the proper control information makes it possible to execute the processing.

Another example using the pseudo-track data creating section is a track initializing process.

Generally, each disk is accessible only by a single operating system in a single access device. However, if the information processing main frame uses a virtual computer or if the disk is shared by a number of information processors, it is occasionally necessary to access data on the disk in different methods.

Assuming that a new disk is purchased or that the disk which had been in use with another information processor is accessed by the format converter utilizing this invention, improper values may probably be appear in the control information section so that a significant fault will occur when the processing is performed using these improper values as proper ones.

In order to prevent this problem, if a new disk is used by the converter of the invention, it is necessary to initialize the disk for use with the converter. This requires accessing to the whole disk, which takes a considerable amount of time, especially during installation.

In this embodiment, the control information section has an identification information section for storing the information indicating the record format of the track.

Since no effective values appear in the identification information section if the track is not initialized, the processing can take place with respect to the unformatted tracks after recording pseudo-track data.

If effective values are already recorded, it will be judged that proper values are written on the track, and so the processing may proceed according to the written information.

Embodiment 8

FIG. 16 shows an eighth embodiment which is a modification of the seventh embodiment. The general processing of this embodiment will now be described, also using FIG. 13.

The request from the application is a process request for positioning at the leading position of the track of the track number 2 and initializing (rewriting all) the track from the record number 1 to the record number n.

Firstly by the command 1-1 of FIG. 16, it is recognized that the track to be processed is track number 2, the track identifying section 202 discriminates whether or not the data of the track is already expanded on the memory. Here it is assumed that the track is not yet expanded. In this case, the pseudo-track data generation discriminating section 207 is called to trace the channel command string (commands 1-2 and 1-3) of FIG. 16 and to discriminate whether or not the process request with respect to the track is a request to rewrite the track from the leading record. In this example, since it is possible to position the retrieving pointer at the leading record of the track to initialize the recording number 1, pseudo-track data of the track number 2 can be created on the memory (see track A in FIG. 16) without calling the direct access storage device reading section 208 of FIG. 13.

Subsequently, as mentioned in connection with the seventh embodiment, the data of the tracks is initialized successively from the record 1 to record n (track B to track C of FIG. 16). By this pseudo-track data generating process, it is possible to prevent waste reading from the direct access storage device, thus increasing the processing rate.

As described above, according to FIGS. 7 and 8, in sequential record process of the records requested by many applications as well as processes of creating, returning or initializing data, it is possible to reduce the emulation processing time and to improve the performance of track emulation process remarkably.

Embodiment 9

Figure 17:
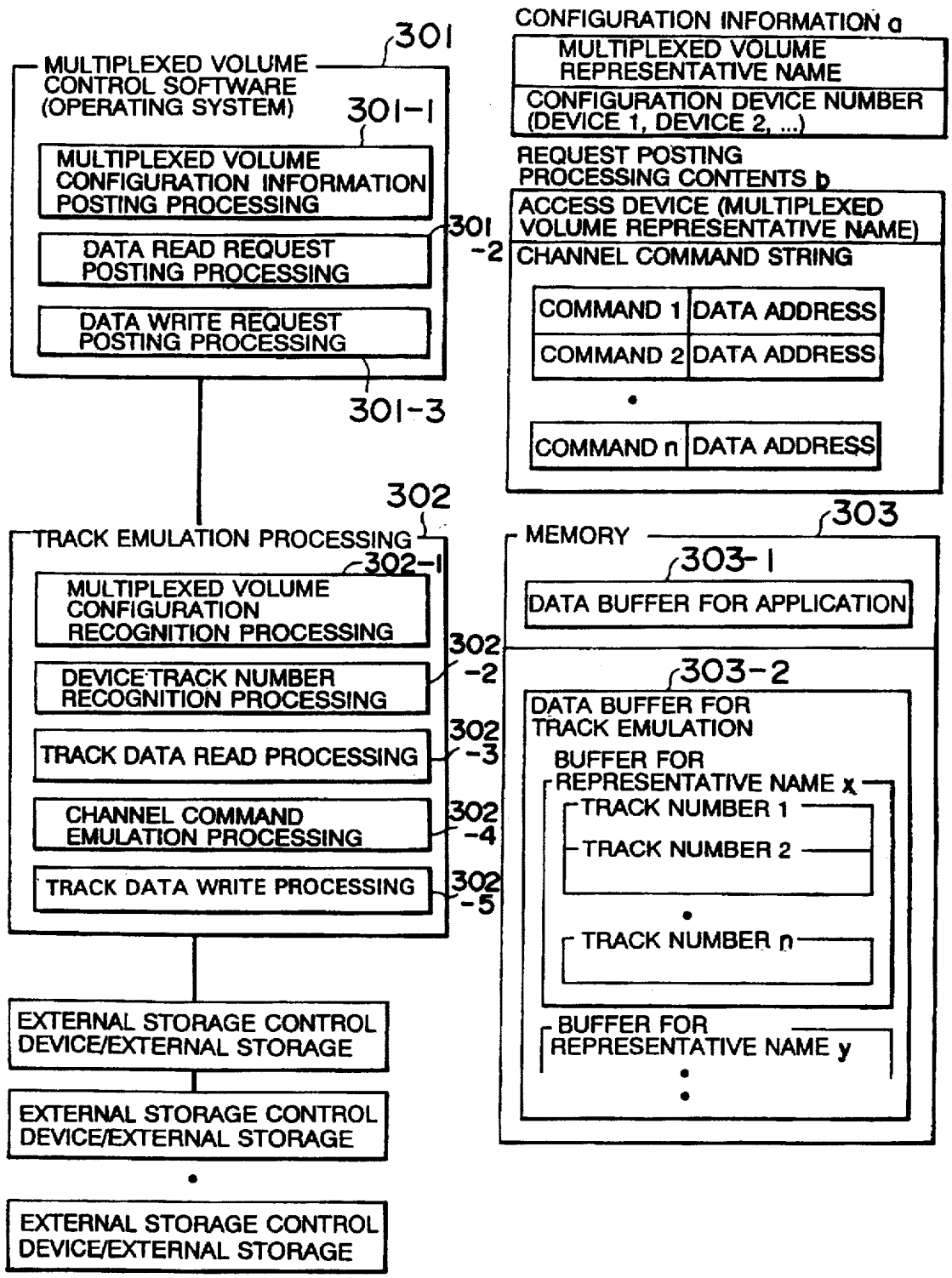
FIG. 17 is a block diagram showing a ninth embodiment.
Figure 19A:
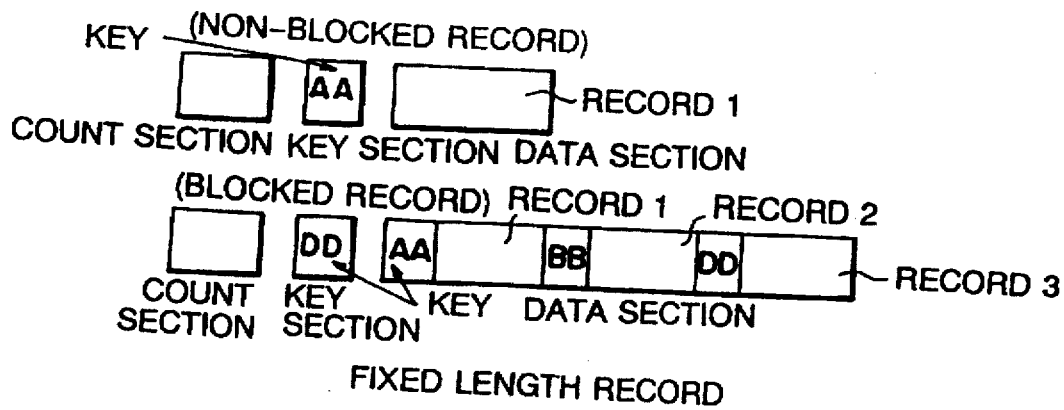
FIGS. 19(a) through 19(c) are diagrams showing various record formats of a direct access storage device.
Figure 19B:
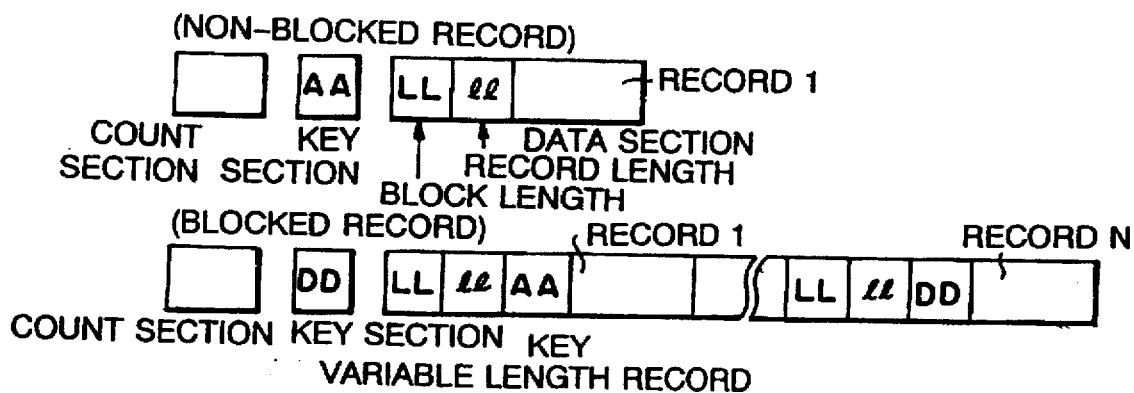
Figure 19C:
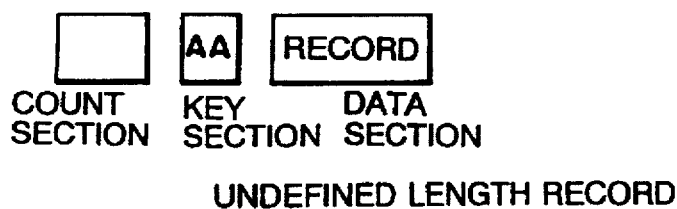
Figure 20A:
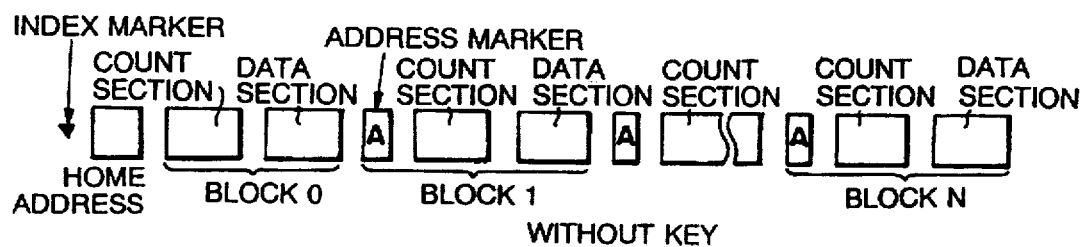
FIGS. 20(a) and 20(b) are diagrams showing various forms of data block.
Figure 20B:
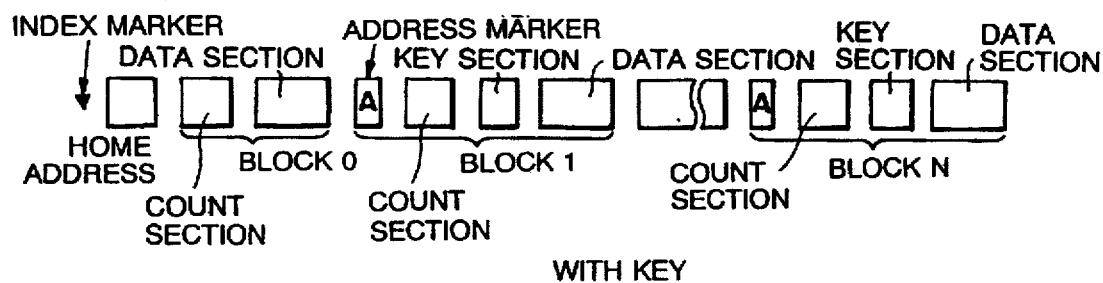

FIGS. 17 and 18 show a ninth embodiment.

This embodiment relates to a track emulation process control system for use with an external storage whose volume is multiplexed. The term "volume" is a record medium detachable and attachable as a single unit like the individual magnetic tape or disk pack.

According to the ninth embodiment, the processing of the first through sixth embodiments can be realized not only for the individual track but also between the plural volumes.

In computers and more particularly in data accessing to an external storage storing massive data base, high-speed accessing and high reliability are very important factors. Regarding high-speed accessing, in the system in which the track data stored in the external storage is expanded on the memory where the access processing from the application takes place, new technology is wanted in order to greatly improve the reliability of data, without impeding the high-speed processing.

One measure for high reliability of data in the conventional track emulation processing is realized by performing emulation processing with respect to the multiplexed individual volumes repeatedly to cope with the multiplexed volume processing to be controlled by the operating system.

As another measure, the external storage is equipped with a multiplexed volume controller independently of the operating system. The latter measure is essential in track emulation processing; in reading track data from the external storage and reflecting the updated data to the external storage, the external storage accesses the multiplexed individual volumes by itself.

However, in the former case, it requires as many data, though of the same format, to be expanded on the memory as the number of multiplexed volumes. Thus, the memory capacity necessary in emulation would unnecessarily increase. Also, track emulation process must be performed as many times as the multiplexed volumes, increasing the overhead, and high-speed processing is therefore difficult to achieve.

In the latter case, the multiplexed volume controllers are required for every external storage and every external storage controller (each controller controls a predetermined number of external storage devices). Connecting the plural external storage devices is inevitable in a large computer system, and hence increases the cost of the computer system. Further, since the external storage controller performs multiplexed controlling by itself, this measure cannot be effective to cope with the problem due to the multiplexing.

Therefore, the measure to obtain high-reliable data in the track emulation processing system is wanted to overcome the conventional problems (increase in memory capacity, overhead and system cost, and other problems due to use of the external storage controller).

Whereas in this embodiment, the multiplexed volume controlling feature of the operating system is combined with the track emulation processing to eliminate the foregoing problems to realize reduction of memory capacity, reduction of overhead and reduction of system cost as well as good fault-proofness to meet either external storage devices or external storage device controllers.

FIG. 17 is a diagram showing the principle of this invention. In FIG. 17, a reference numeral 301 designates an operating system for controlling the multiplexed volumes.

A reference numeral 301-1 designates a processing section for posting to the track emulation processing section the configuration information of the devices when any change has occurred in any element or part of the devices, which includes multiplexed volumes, as it is multiplexed, disconnected or reassembled.

The configuration information comprises a name representing the multiplexed volumes, and device numbers one for each of plural devices.

A reference numeral 301-2 designates a data read request posting section for posting to the track emulation processing section of a read request with respect to the multi-volume device upon receipt from the application.

A reference numeral 301-3 designates a data write request posting section for posting to the track emulation processing section a write request from the application.

The sections 301-2 and 301-3 are each for posting to the track emulation processing section a name representing the multiplexed volumes, and a channel command string to access.

In FIG. 17, a reference numeral 302 designates the track emulation processing section.

A reference numeral 302-1 designates a multiplexed volume configuration recognition processing section for holding the configuration information posted from the operating system.

A reference numeral 302-2 designates a device track number recognition processing section for receiving the data reading or writing process requested from the operating system, recognizing the name representing multiplexed volumes to access and the track number, discriminating whether or not the track data is already expanded on the memory, and performing the processing of 302-3 (described below) if not expanded (if expanded, 302-4 is called).

A reference numeral 302-3 designates a track data read processing section for reading track data from the external storage in which track data requested to accessed from the operation system is stored. The reading device reads a selected one of plural devices composing the name representing the designated multiplexed volumes (as they are multiplexed volumes, the same contents are stored in each device) and manages the track data for every representative name on the memory.

A reference numeral 302-4 corresponds to processing that will be called when the track data is expanded on the memory or after expansion, designating the process of emulating on the memory the process (channel command string) requested from the operating system.

A reference numeral 302-5 corresponds to processing that will be called after the emulation process has been completed and when the track data is updated, designating the process of reflecting the updated information to the external storage. The writing device writes with respect to every device composing the name representing the designated multiplexed volumes.

In FIG. 17, 303 designates a memory; 303-1, a data buffer area necessary to the application of the operating system, 303-2, a track data expansion area to be managed for every representative name needed in the track emulation process.

In this invention, as shown in FIG. 17, by using the multiplexed volume configuration information posting section 301-1, the configuration information a, the multiplexed volume configuration recognition processing section 302-1, the track data 303-2 for every representative name, and 'the access object device selecting processes (by the representative names)' in the track data read/write processes designated by 302-3, 302-5, the required memory capacity for track data expansion is such that it meets at least only a single device representing the devices composing the multiplexed volumes. The emulation process of the channel command string should be performed only with respect to a single device. Further, the devices composing the multiplexed volumes may be associated with any of the external storage controllers. An inexpensive controller having no multi-volume control feature can be used. By dividing the controllers associated with the plural devices, it is possible to decentralize possible risks.

Utilizing the multiplexed volume control of the existing operating system, the track emulation process, and the existing external storage devices or external storage controllers, and by adding the improvements according to this invention, it is possible to realize a high-performance and high-reliability track emulation processing system which enables reduction of required memory capacity, reduction of overhead of emulation process, reduction of system cost, and good fault-proofness of both the external storage devices and external storage controllers.

FIG. 18 shows the processing of the ninth embodiment. The processing will be described as follows, also using FIG. 17 to illustrate the principle of the invention. For illustration here, it is assumed that a data write request from the operating system is made with respect to the device (representative name X) composing multiplexed volumes.

In FIG. 18, a reference numeral 401 designates configuration information previous posted to the track emulation processing section from the operating system. A reference numeral 402 designates the process that the data write request posting section (301-3 in FIG. 17) of the operating system has given an instruction to the track emulation processing section. The record 2 of the track number 1 is retrieved with respect to the representative name x to the data of record which is rewritten by the designated data.

In this case, firstly the device track number recognition processing section 302-2 of FIG. 17 discriminates whether or not the track number 1 of the requested representative name x is already expanded on the memory. Assuming that it is not yet expanded, control is transferred to the track data read processing section 302-3 of FIG. 17 where the device 1, for example, is selected from the devices composing the representative name x, and the data corresponding track number 1 is expanded on the memory 403 of FIG. 18 (404 in FIG. 18). Then, control is passed to the channel command emulation processing section 302-4 of FIG. 17 to emulate the requested channel command string, retrieve the object record 2 and write in the data section the data designated by the operating system (405 in FIG. 18). Upon completion of emulation of the channel command string, control is passed to the track data write processing section 302-5 of FIG. 17 where the updated portion (portion of the record 2) on the track is written in every device (device 1 and device 2) composing the representative name X to complete the process (406 and 407 in FIG. 18).

As mentioned above, this invention enables reduction of memory capacity, reduction of overhead, reduction of system cost and can achieve adequate fault-proof, thus improving the processing rate of track emulation and the degree of reliability.

With the arrangement of this invention, since the format converter is situated on the information processing main frame, it is possible to control the reading and writing with respect to plural external storage devices of different record formats at high speed by a single access device.

In particular, when this system is used to access a magnetic disk device or optical disc unit of fixed length record format by the variable length record format, the conventional fixed length record magnetic disk or optical disk, which is high in processing rate, small in size and low in cost, can be accessed also from software of a different length record format. It is therefore possible to make the whole system high in performance, small in size and low in cost.

What is claimed is:

1. An input-output control system for an external storage, comprising:
   (a) an information processing main frame having a CPU and a main storage;
   (b) software loaded in said information processing main frame for holding data in an arbitrary record format;
   (c) an external storage, connected to said information processing main frame, for recording the data in a record format different from the record format of said software; and
   (d) a record format converter, mounted in said information processing main frame, comprising
      a specified format command string detector for detecting whether at least one command which is created by said software to access said external storage is of a specified format, and
      batch processing means for executing the plural commands in batch by emulating a command string of the at least one command, and by emulating the data record format of said external storage as the data record format of said software, if said specified format command string detector has detected that the at least one command is of a specified format command string.

2. An input-output control system according to claim 1, wherein said external storage has a plurality of tracks, and if a plurality of commands to be given span a certain number of said tracks, said batch processing means executes the processing of the commands with respect to the individual tracks in batch.

3. An input-output control system according to claim 2, wherein said information processing main frame has a memory, and said batch processing means performs on said memory the processing of the given plural commands with respect to the plural tracks and posts to said software that the given plural commands have been processed in batch.

4. An input-output control system according to claim 1, wherein said external storage has a plurality of volumes, and if a plurality of commands to be given span a certain number of said volumes, said batch processing means executes the processing of the plural commands with respect to the individual volumes in batch.

5. An input-output control system according to claim 4, wherein said information processing main frame has a memory, and said batch processing means performs on said memory the processing of the given plural commands with respect to the plural volumes and posts to said software that the plural commands of the plural volumes have been processed in batch.

6. An input-output control system according to claim 1, further comprising a specified command string register section for registering command strings of a specified format previously, and said specified format command string detector has access to said specified command string register section to detect whether the given commands are of the specified format.

7. An input-output control system according to claim 6, further comprising specified format command string qualifying means for detecting a pattern in a given command string, for qualifying the given command string of the pattern to be the specified format command string if the same pattern appears a set number of times and, for entering the command string in said specified format command string register section.

8. An input-output control system according to claim 1, wherein said information processing main frame has a memory, and if a given command is a request for processing the whole data in a block, said information processing main frame creates default data on said memory without reading the block data from said external storage and processes the default data.

9. An input-output control system according to claim 8, further comprising:
   control information temporary register means for, if the given command is a request for processing the whole block data except control information, reserving the control information in a reserve area on said external storage; and
   control information return means for copying the control information on said reserve area onto a control information area on the data.

10. An input-output control system according to claim 1, further comprising record format identification information adding means for adding, to control information, identification information indicative of the format to which the data has been converted, when recorded on said external storage, to discriminate as to whether the data stored in said external storage has been converted in format, or as to which format the data has been converted to.

11. An input-output control system according to claim 10, further comprising processing object selecting means for discriminating the record format of the data with reference to said identification data added by said record format identification information adding means, and for selecting whether the discriminated record format is the record format of a processing object; and
   a pseudo-track data generator for generating pseudo-track data with the area of the data used as an unrecorded area, if said processing object selecting means has decided that the data is not the processing object.

12. An input-output control system according to claim 1, further comprising:
   a memory for temporarily storing the data read from said external storage; and
   a direct access storage (DASD) writing section for, upon receiving a command from said software to write data into said external storage after said data has once been read from said external storage to said memory, performing the writing of the data with respect to said memory rather than said external storage, and for writing the data back to said external storage after the processing of the data on said memory has been terminated.

13. An input-output control system according to claim 12, wherein said DASD writing section suspends the writing of the data to said external storage until the data processing on said memory coincides with a predetermined condition.

14. An input-output control system according to claim 12, wherein said DASD writing section presents a flag indicating that the data on said external storage is different from that on said memory, when the writing of the data back to said external storage has failed.

15. An input-output control system according to claim 1, further comprising access managing means for performing busy managing and getting reaccess to said external storage when said external storage or a communication channel to said external storage is busy, said busy managing including reporting of a busy status or a busy released status to be received by said software.

16. An input-output control system according to claim 1, further comprising error control means for performing an error analysis, when an error occurs during getting access to said external storage, and for getting reaccess to said external storage, if necessary.

17. An input-output control system according to claim 6, wherein said specified format command string register section is a specified format channel command string detecting data map in which channel commands of a specified format are registered, and said specified format command detector detects a channel command string of the specified format by using said specified format channel command string detecting data map, and said batch processing means simulates the whole of said specified format channel command string in batch if the specified format channel command string has been detected.

18. An input-output control system according to claim 1, wherein said external storage is a direct access storage device (DASD) having a plurality of tracks, said system further comprising:

a DASD reading section for expanding on said memory all of the record stored in an least one track of said DASD;

an object record retrieval section for retrieving, from the track record expanded on said memory, an object record by using a retrieval pointer;

an object processing section for performing an object processing with respect to the record retrieved according to a given channel command string; and a retrieval pointer correcting section for updating said retrieval pointer, after the processing in said object processing section with respect to the record designated by said retrieval pointer has been completed, to designate the next processing object.

19. An input-output control system according to claim 18, further comprising:

command identification means for discriminating whether or not the given channel command string is a request for rewriting the whole data from front to end in said at least one track; and a pseudo-track data generator for generating pseudo-track data with the area of the data used as an unrecorded area, if said processing object selecting means has decided that the data is not the processing object, and for executing the channel command string with respect to the pseudo-track data to rewrite the whole data, without expanding the data onto said memory by said DASD reading section, if said command identification means has decided that the command is a request for rewriting the whole record.

20. An input-output control system according to claim 18, further comprising identifying means for discriminating whether the track to be accessed has already been expanded onto said memory.

21. An input-output control system according to claim 1, wherein said external storage has a multiplexed volume including a plurality of volumes, each having a plurality of tracks in which the data is recorded, said system further comprising:

volume configuration information posting means for creating configuration information to which device numbers, which compose said multiplexed volume, and a name representing these device numbers are added, and for posting said configuration information to said track emulation processing section;

selecting means for selecting said external storage to get access to, based on said configuration information;

track data reading means for expanding the track data onto said memory in said name representing said multiplexed volume; and track emulation processing means for executing the track emulation processing with respect to the track data expanded onto said memory.

22. An input-output control system according to claim 1, wherein said external storage has a multiplexed volume including a plurality of volumes, each having a plurality of tracks in which the data is recorded, said system further comprising:

volume configuration information posting means for creating configuration information to which device numbers, which compose said multiplexed volume, and a name representing these device numbers are added, and for posting said configuration information to said track emulation processing section;

selecting means for selecting said external storage to get access to, based on said configuration information;

track data reading means for expanding the track data onto said memory in said name representing said multiplexed volume; and track emulation processing means for executing the track emulation processing with respect to the track data expanded onto said memory; and wherein said selecting means selects any of said storage devices, which compose said multiplexed volume, to get access in the data reading process, and selects all of said storage devices, which compose said multiplexed volume, in the data writing process.

* * * * *